United States Patent
Suzuki et al.

(10) Patent No.: US 11,104,328 B2
(45) Date of Patent: Aug. 31, 2021

(54) PARKING CONTROL METHOD AND PARKING CONTROL DEVICE

(71) Applicant: Nissan Motor Co., Ltd., Yokohama (JP)

(72) Inventors: Yasuhiro Suzuki, Kanagawa (JP); Yasuhisa Hayakawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/637,040

(22) PCT Filed: Aug. 10, 2017

(86) PCT No.: PCT/JP2017/029210
§ 371 (c)(1),
(2) Date: Feb. 6, 2020

(87) PCT Pub. No.: WO2019/030922
PCT Pub. Date: Feb. 14, 2019

(65) Prior Publication Data
US 2020/0238978 A1    Jul. 30, 2020

(51) Int. Cl.
*B60W 30/06*    (2006.01)
*B60W 60/00*    (2020.01)
(Continued)

(52) U.S. Cl.
CPC ............ *B60W 30/06* (2013.01); *B60W 40/09* (2013.01); *B60W 60/0051* (2020.02);
(Continued)

(58) Field of Classification Search
CPC .. B60W 30/06; B60W 40/09; B60W 60/0051; B60W 2540/22; B60W 30/025;
(Continued)

(56) References Cited

U.S. PATENT DOCUMENTS

2010/0063663 A1* 3/2010 Tolstedt ............... G05D 1/0231
701/23
2015/0050906 A1* 2/2015 Yuasa ..................... H04W 4/46
455/404.2
(Continued)

FOREIGN PATENT DOCUMENTS

JP    2007-272835 A    10/2007
JP    2008-174192 A    7/2008
(Continued)

Primary Examiner — Bao Long T Nguyen
(74) *Attorney, Agent, or Firm* — Young Basile Hanlon & MacFarlane, P.C.

(57) ABSTRACT

A parking control method is provided for executing a control instruction to move a vehicle along a parking route on the basis of an operation command acquired from an operator located outside the vehicle. This method includes detecting movement of the operator; calculating an anxiety level of the operator from the movement of the operator; and when the anxiety level is less than a predetermined threshold, parking
(Continued)

the vehicle in accordance with a first control instruction that is preliminarily set in the control instruction, while when the anxiety level is not less than the predetermined threshold, calculating a second control instruction obtained by limiting a control range of the first control instruction, and parking the vehicle in accordance with the second control instruction.

11 Claims, 25 Drawing Sheets

(51) Int. Cl.
*B60W 40/09* (2012.01)
*G05D 1/00* (2006.01)
*G05D 1/02* (2020.01)

(52) U.S. Cl.
CPC ......... *G05D 1/0016* (2013.01); *G05D 1/0061* (2013.01); *G05D 1/0212* (2013.01); *B60W 2540/22* (2013.01); *G05D 2201/0213* (2013.01)

(58) Field of Classification Search
CPC ......... B60W 40/08; B60W 2040/0872; B60W 40/105; B60W 2050/0077; B60W 50/10; B60W 2540/221; G05D 1/0061; G05D 1/0212; G05D 1/0016; G05D 2201/0213; G05D 1/0223; G06K 9/00791
USPC .................................................. 701/2, 23, 28
See application file for complete search history.

(56) References Cited

U.S. PATENT DOCUMENTS

| | | | |
|---|---|---|---|
| 2015/0243172 | A1 | 8/2015 | Eskilson |
| 2015/0367845 | A1* | 12/2015 | Sannodo ............... B60W 30/08 701/23 |
| 2015/0375740 | A1* | 12/2015 | Okamura ............ B60W 30/146 701/25 |
| 2017/0032680 | A1 | 2/2017 | Imai et al. |
| 2018/0037262 | A1 | 2/2018 | Imai |
| 2018/0259956 | A1 | 9/2018 | Kawamoto |
| 2020/0148263 | A1 | 5/2020 | Imai |

FOREIGN PATENT DOCUMENTS

| | | |
|---|---|---|
| JP | 2010-018167 A | 1/2010 |
| JP | 2014-146288 A | 8/2014 |
| JP | 5984745 B2 | 9/2016 |
| JP | 2016-185745 A | 10/2016 |
| JP | 2017-007399 A | 1/2017 |
| JP | 2017-030481 A | 2/2017 |
| KR | 2015-0055052 A | 5/2015 |
| WO | 2017/057060 A1 | 4/2017 |
| WO | 2017/068698 A1 | 4/2017 |

* cited by examiner

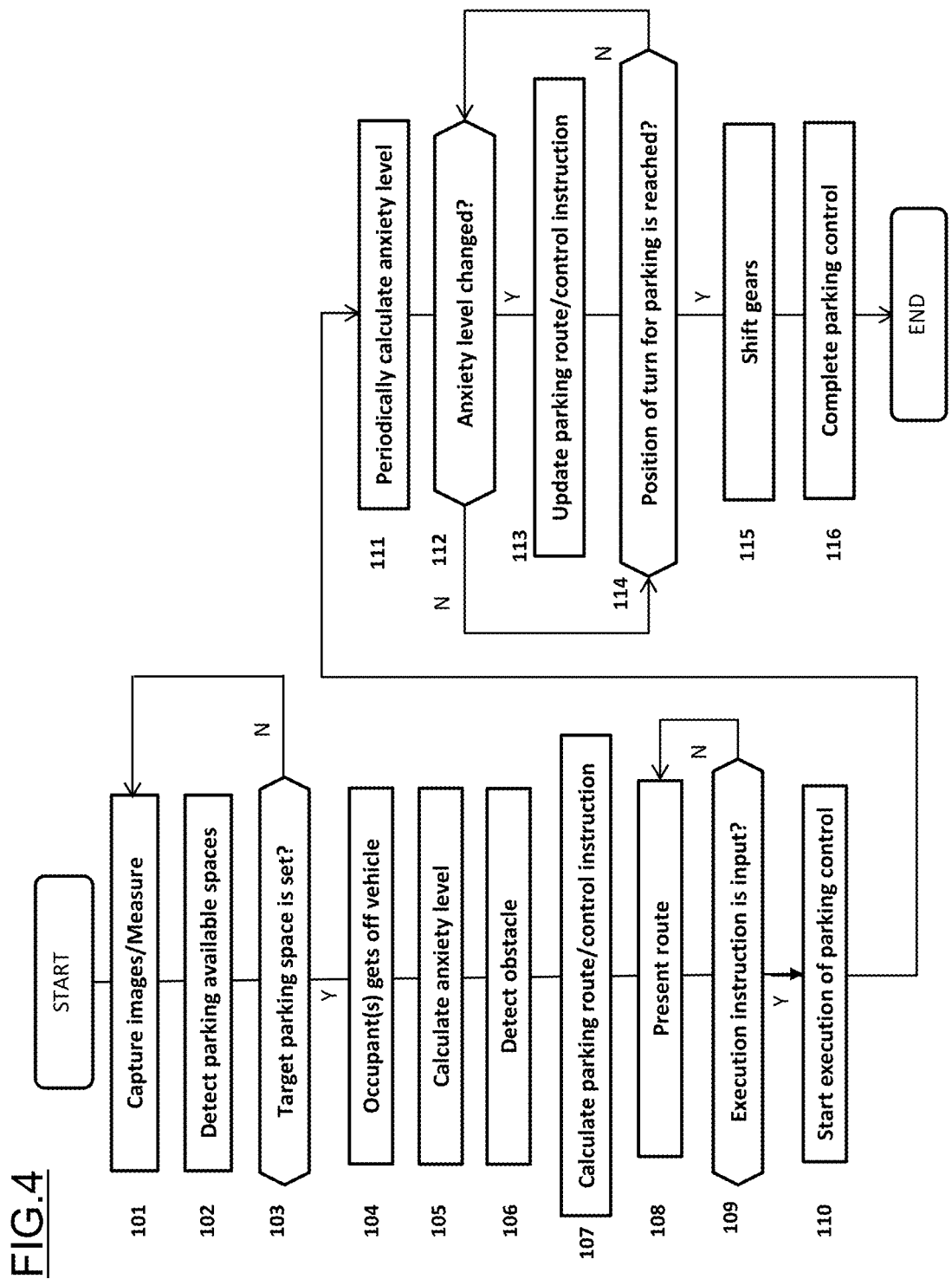

FIG. 6

| Movement information of operator | | Anxiety level | |
|---|---|---|---|
| Movement amount | Less than threshold | Anxiety level AX1 | 0 |
| | Not less than threshold | Anxiety level AX2 | 1 |
| Behavior | Less than threshold | Anxiety level AX1 | 0 |
| | Not less than threshold | Anxiety level AX2 | 1 |
| Distribution | Less than threshold | Anxiety level AX1 | 0 |
| | Not less than threshold | Anxiety level AX2 | 1 |

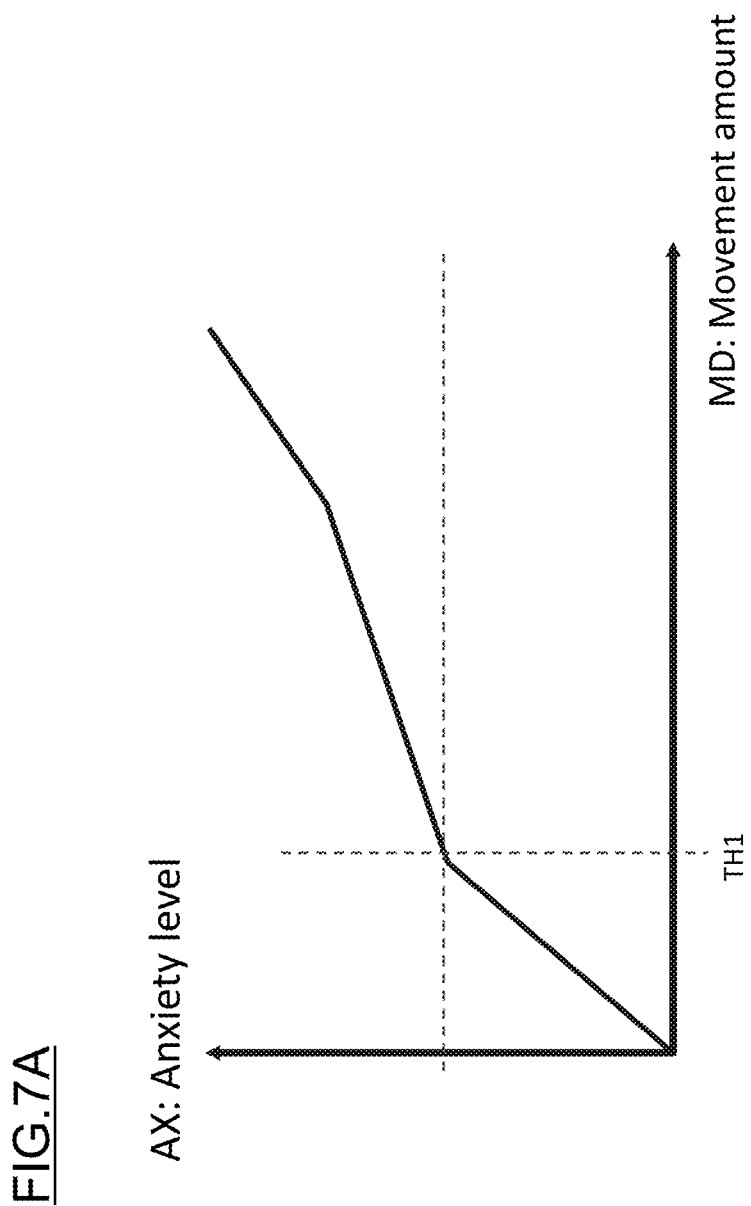

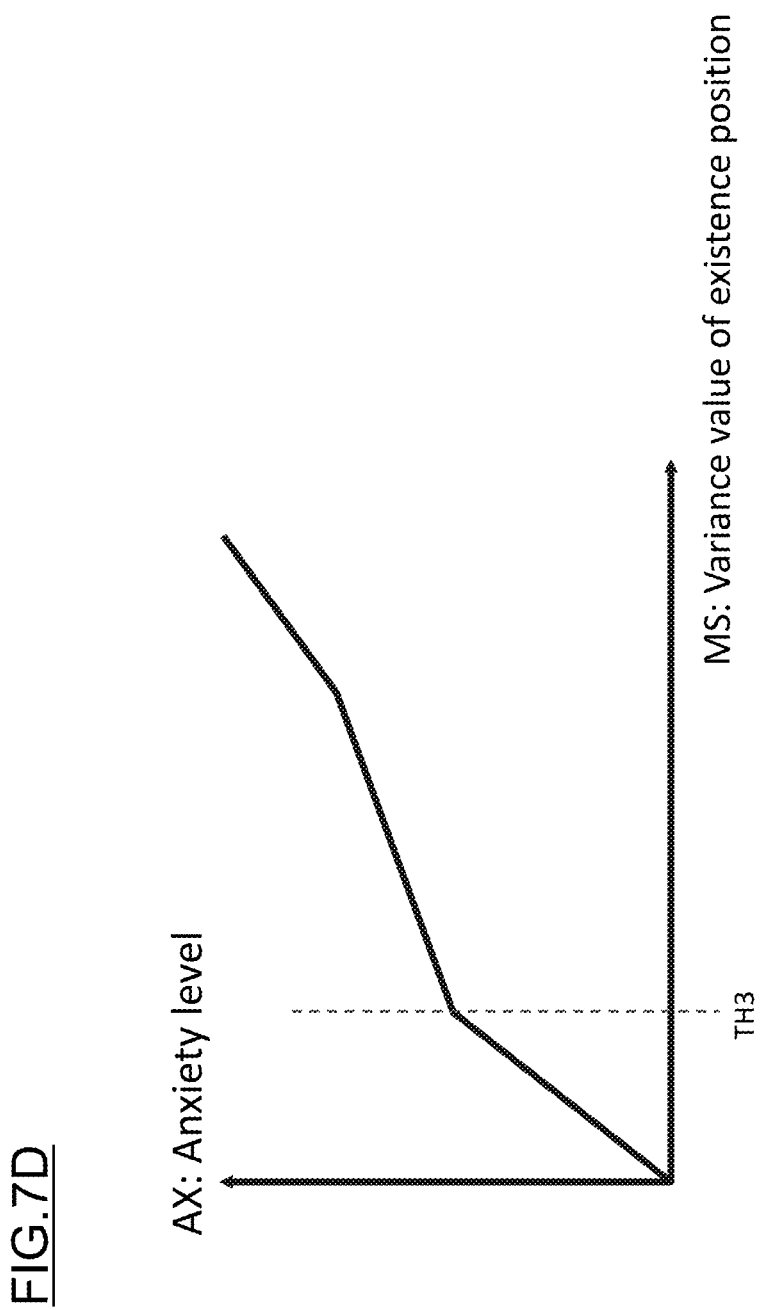

FIG.8A

| Anxiety level | Limitation range | |
|---|---|---|
| | Margin distance between obstacle and parking route | |
| Less than threshold | | First margin distance (20 cm) |
| Not less than threshold | | Second margin distance (50 cm) > First margin distance (20 cm) |

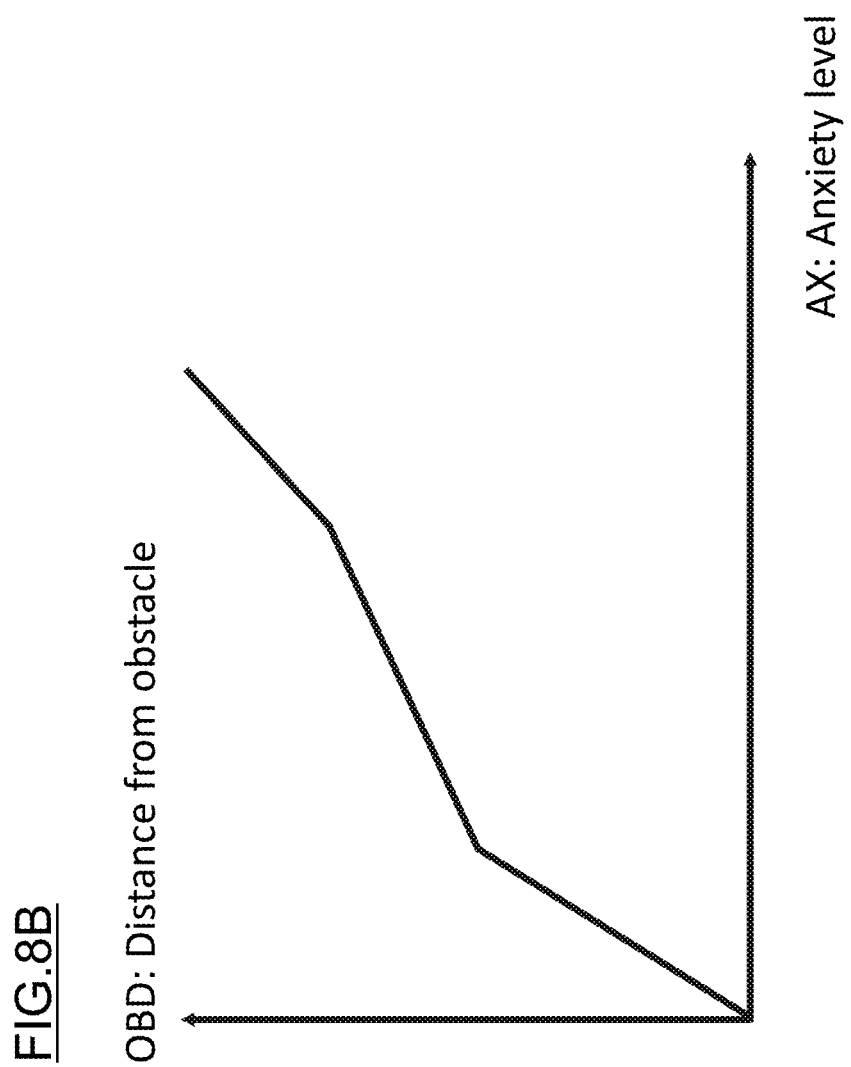

FIG.9A

| Anxiety level | | Control range |
|---|---|---|
| Less than threshold | Upper limit speed | First upper limit speed (10 km/h) > Second upper limit speed (5 km/h) |
| Not less than threshold | | Second upper limit speed (5 km/h) < First upper limit speed (10 km/h) |
| Less than threshold | Upper limit acceleration | First upper limit acceleration (0.1 G) > Second upper limit acceleration (0.05 G) |
| Not less than threshold | | Second upper limit acceleration (0.05 G) < First upper limit acceleration (0.1 G) |
| Less than threshold | Upper limit deceleration | First upper limit deceleration (0.1 G) > Second upper limit deceleration (0.05 G) |
| Not less than threshold | | Second upper limit deceleration (0.05 G) < First upper limit deceleration (0.1 G) |
| Less than threshold | Turning speed (Steering speed) | First turning speed (Steering speed) > Second turning speed |
| Not less than threshold | | Second turning speed (Steering speed) < First turning speed |

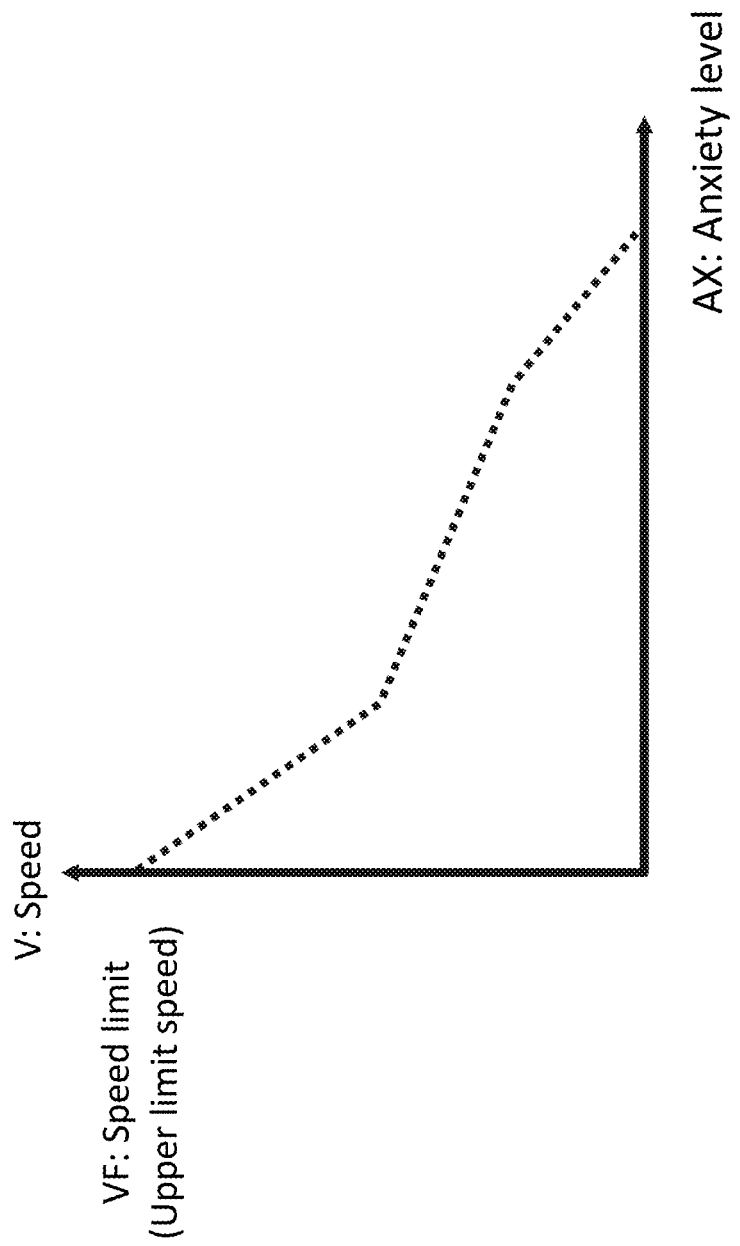

VT: Target speed
VA: Target acceleration

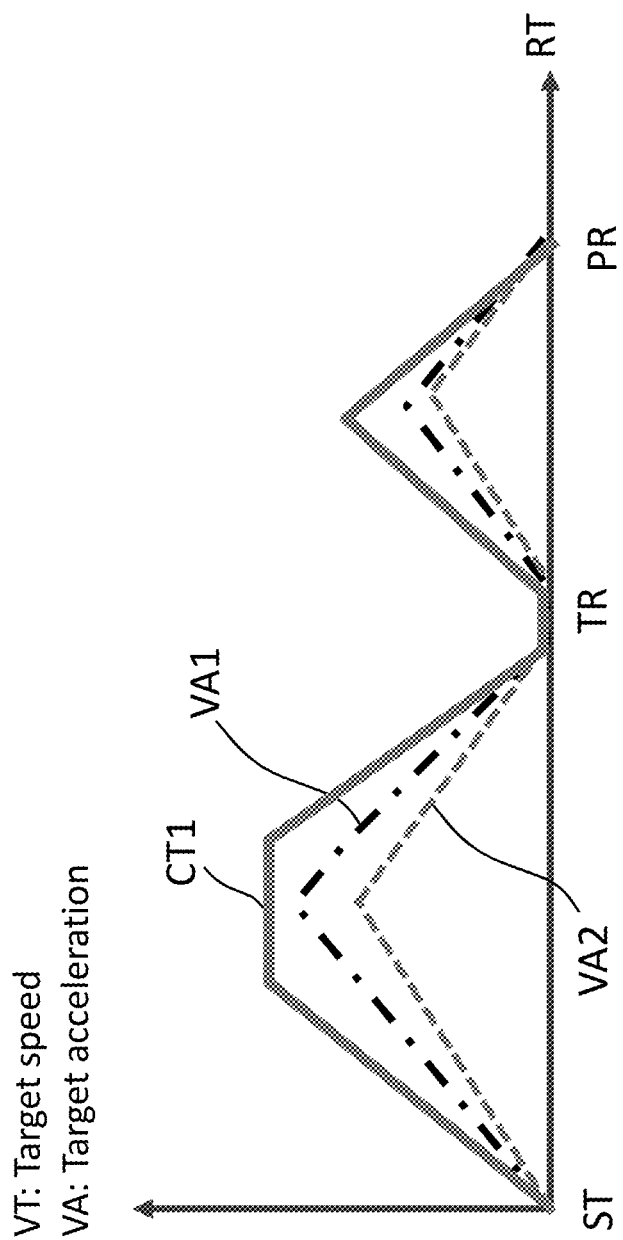

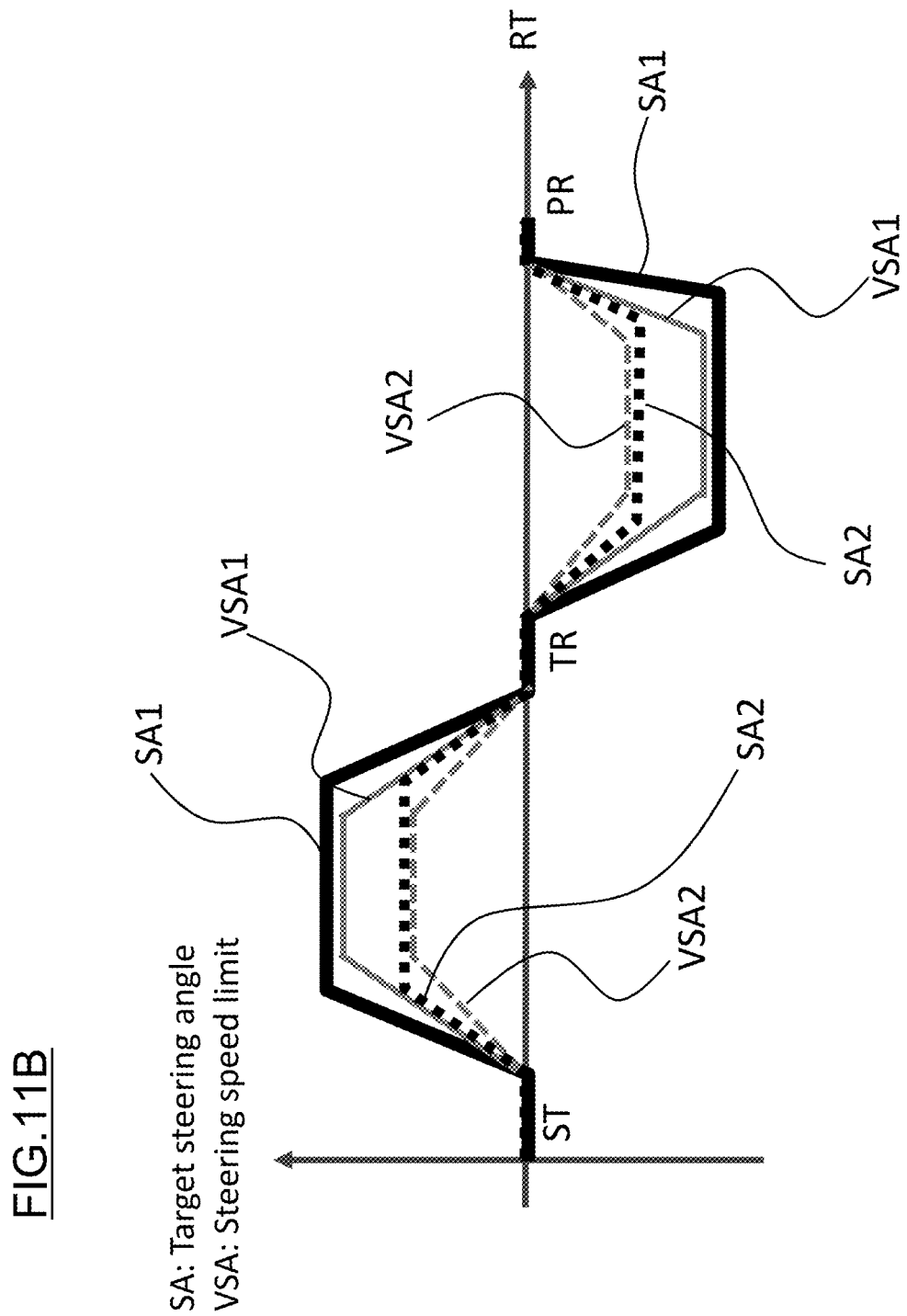

FIG.12

| Anxiety level | Available menu | Control range |
|---|---|---|
| Less than threshold | | Position adjustment menu, Screen setting menu, Go/Stop menu |
| Not less than threshold | | Go/Stop menu |
| Less than threshold | Selectable parking mode | Parking form selection, Quick mode |
| Not less than threshold | | Rescue mode |

FIG.13A
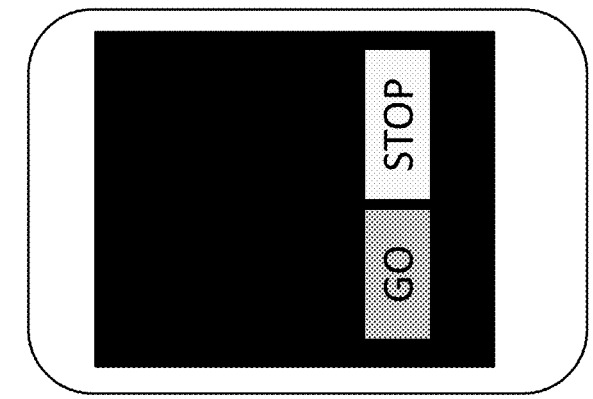
AX<Thax
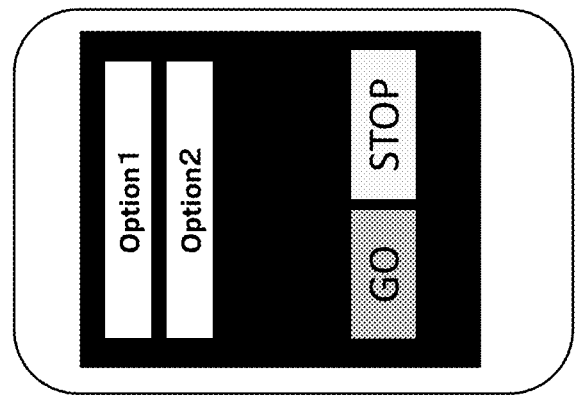
AX≧Thax

FIG.13B
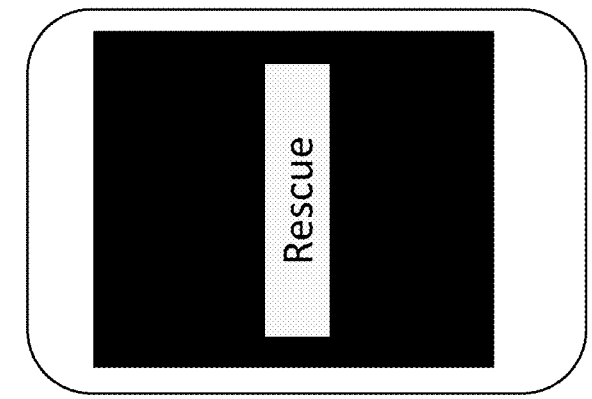
AX≧Thax
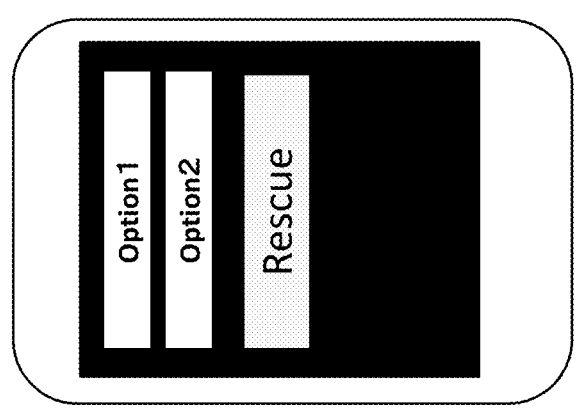
AX<Thax

PARKING CONTROL METHOD AND PARKING CONTROL DEVICE

TECHNICAL FIELD

The present invention relates to a parking control method and a parking control apparatus.

BACKGROUND

A technique is known, which allows a vehicle to move to follow the movement of a portable device while maintaining the positional relationship with the portable device (JP5984745B).

SUMMARY

The vehicle constantly follows the movement of the portable device as the portable device is moved, and the user may therefore feel anxiety about the operation at a place at which it is difficult for the vehicle to travel or other similar places.

A problem to be solved by the present invention is to park a vehicle by a control instruction with a control range that reduces the anxiety of an operator who performs the remote parking operation.

The present invention solves the above problem through, when an anxiety level of an operator calculated from the movement of the operator is less than a predetermined threshold, parking the vehicle in accordance with a first control instruction that is preliminarily set in a control instruction, while when the anxiety level is not less than the predetermined threshold, calculating a second control instruction obtained by limiting a control range of the first control instruction, and parking the vehicle in accordance with the second control instruction.

According to the present invention, the vehicle can be parked by the control instruction with a control range that reduces the anxiety of the operator who performs the remote parking operation.

BRIEF DESCRIPTION OF THE DRAWINGS

FIG. 4 is a flowchart illustrating an example of a control procedure executed by the parking control system according to one or more embodiments of the present invention;

FIG. 6 is a diagram illustrating the relationship between the movement of an operator and the anxiety level;

FIG. 7A is a diagram illustrating the relationship between a movement amount MD of an operator and an anxiety level AX;

FIG. 7D is a diagram illustrating the relationship with a variance value MS of the moving position of an operator;

FIG. 8A is a diagram illustrating an example of the control range of a parking route calculation process;

FIG. 8B is a diagram illustrating the relationship between an anxiety level AX and a margin distance OBD of the parking route;

FIG. 9A is a diagram illustrating an example of the control range of a control instruction calculation process;

FIG. 9B is a diagram illustrating the relationship between an anxiety level AX and an upper limit speed VM;

FIG. 10B is a diagram illustrating a second example of the control instruction regarding the speed;

FIG. 11B is a diagram illustrating a second example of the control instruction regarding the steering angle;

FIG. 12 is a diagram illustrating an example of the control range of an operation menu presentation process;

FIG. 13A is a diagram illustrating a first example of the control instruction regarding the operation menu; and FIG. 13B is a diagram illustrating a second example of the control instruction regarding the operation menu.

DETAILED DESCRIPTOIN

Hereinafter, one or more embodiments of the present invention will be described with reference to the drawings.

In the embodiments, the present invention will be described by exemplifying a case in which the parking control apparatus according to the present invention is applied to a parking control system. The parking control apparatus may also be applied to a portable operation terminal (equipment such as a smartphone or a PDA: Personal Digital Assistant) capable of exchanging information with an onboard apparatus. The parking control method according to the present invention can be used in the parking control apparatus, which will be described below.

Figure 1:
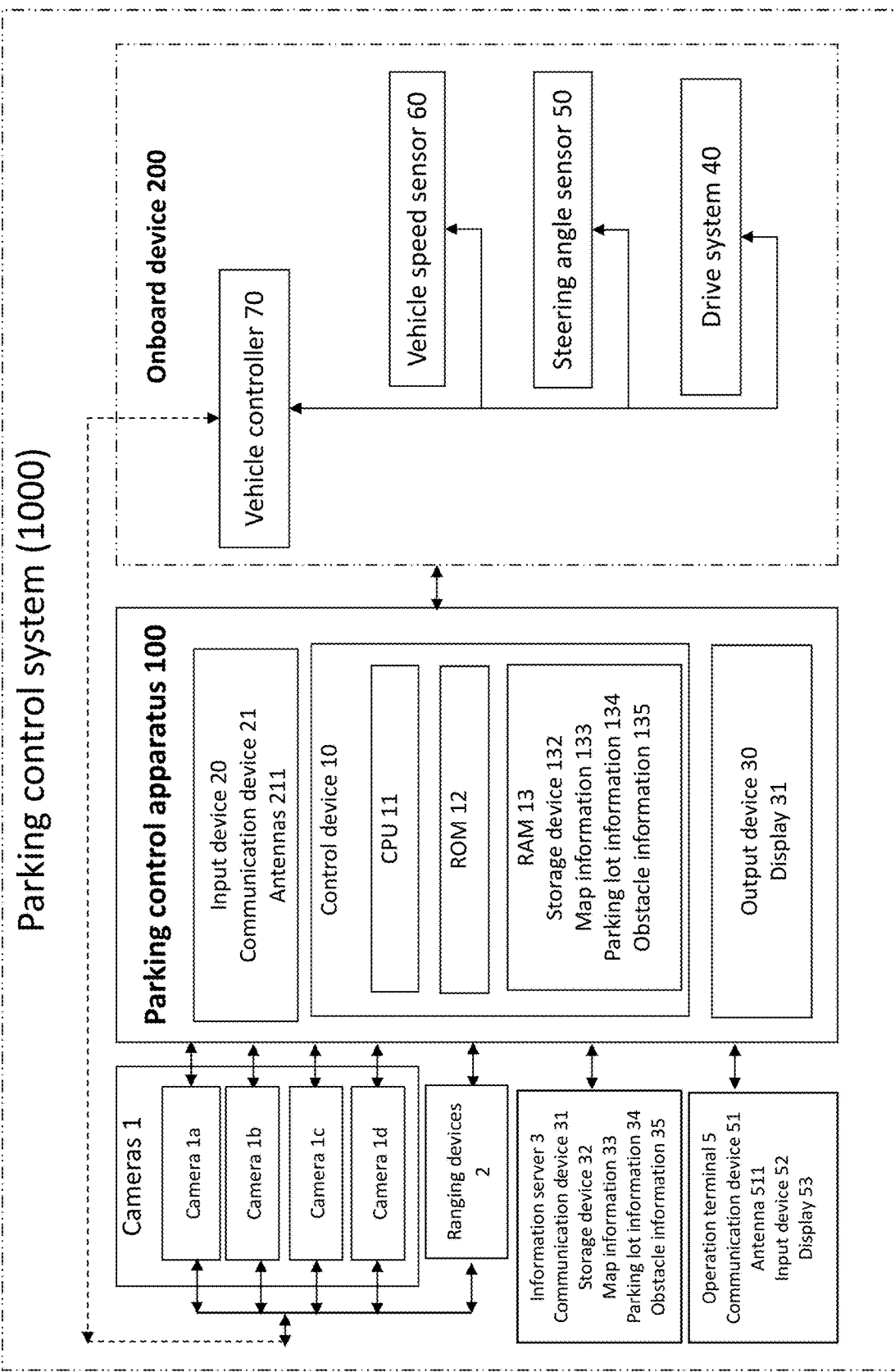
FIG. 1 is a block diagram illustrating an example of a parking control system according to one or more embodiments of the present invention.

FIG. 1 is a block diagram of a parking control system 1000 including a parking control apparatus 100 according to one or more embodiments of the present invention. The parking control system 1000 according to one or more embodiments of the present invention includes cameras 1a to 1d, ranging devices 2, an information server 3, an operation terminal 5, the parking control apparatus 100, a vehicle controller 70, a drive system 40, a steering angle sensor 50, and a vehicle speed sensor 60. The parking control apparatus 100 according to one or more embodiments of the present invention operates to control the operation of moving (parking) a vehicle V as the target of parking control into a parking space on the basis of an operation command that is input from the operation terminal 5.

The operation terminal 5 is a portable computer that can be brought out to outside of the vehicle V and has an input function and a communication function. The operation terminal 5 receives the input of an operation command made by an operator M for controlling the driving (operation) of the vehicle V for parking. The driving includes operations for parking (operations for entering a parking space and exiting the parking space). The operator M inputs instructions via the operation terminal 5. The instructions include an operation command for execution of parking. The operation command includes information on the execution/stop of parking control, selection/change of a target parking position, and selection/change of a parking route and other information necessary for parking. The operator M can also make the parking control apparatus 100 recognize the instructions including the operation command without using the operation terminal 5, such as by a gesture of the operator M (i.e., the operator M can input such instructions to the parking control apparatus 100 without using the operation terminal 5, such as by a gesture).

The operation terminal 5 includes a communication device and is capable of exchanging information with the parking control apparatus 100 and the information server 3. The operation terminal 5 transmits the operation command, which is input outside the vehicle, to the parking control apparatus 100 via a communication network and inputs the operation command to the parking control apparatus 100. The operation terminal 5 communicates with the parking control apparatus 100 using signals including a unique identification code. The operation terminal 5 includes a display 53. The display 53 presents an input interface and various information items. When the display 53 is a touch panel-type display, it has a function of receiving the operation command. The operation terminal 5 may be portable equipment, such as a smartphone or a PDA: Personal Digital Assistant, in which applications are installed for receiving an input of the operation command used in the parking control method according to one or more embodiments of the present invention and transmitting the operation command to the parking control apparatus 100.

The information server 3 is an information provision device provided on a network capable of communication. The information server includes a communication device 31 and a storage device 32. The storage device 32 includes readable map information 33, parking lot information 34, and obstacle information 35. The parking control apparatus 100 and the operation terminal 5 can access the storage device 32 of the information server 3 to acquire each information item.

The parking control apparatus 100 according to one or more embodiments of the present invention includes a control device 10, an input device 20, and an output device 30. These components of the parking control apparatus 100 are connected to one another via a controller area network (CAN) or other onboard LAN to mutually exchange information. The input device 20 includes a communication device 21. The communication device 21 receives the operation command transmitted from the external operation terminal 5 and inputs the operation command to the input device 20. The subject who inputs the operation command to the external operation terminal 5 may be a person (a user, a passenger, a driver, or a worker of a parking facility). The input device 20 transmits the received operation command to the control device 10. The output device 30 includes a display 31. The output device 30 notifies the driver of parking control information. The display 31 according to one or more embodiments of the present invention is a touch panel-type display having an input function and an output function. When the display 31 has an input function, it serves as the input device 20. Even when the vehicle V is controlled on the basis of the operation command which is input from the operation terminal 5, an occupant (driver or passenger) can input an operation command, such as a command for emergency stop, via the input device 20.

The control device 10 of the parking control apparatus 100 according to one or more embodiments of the present invention is a computer for parking control including a ROM 12 that stores a parking control program, a CPU 11 as an operation circuit that executes the program stored in the ROM 12 to serve as the parking control apparatus 100 according to one or more embodiments of the present invention, and a RAM 13 that serves as an accessible storage device.

The parking control program according to one or more embodiments of the present invention is a program for, when an anxiety level calculated from the movement of an operator who performs the remote operation is less than a predetermined threshold, parking the vehicle in accordance with a first control instruction that is preliminarily set, while when the anxiety level of the operator is not less than the predetermined threshold, executing the parking control for the vehicle V in accordance with a control instruction obtained by limiting a control range of the preliminarily set first control instruction.

Here, the control range refers to a range in which the control is permitted. The control range includes a range of speed at which the vehicle is moved and a margin distance between the vehicle and another object or the like. Specifically, the control range is defined by a control speed value range that is defined by the upper limit and lower limit of a speed of the vehicle and a margin distance value range that is defined by the upper limit and lower limit of a margin distance. The speed to be controlled includes the vehicle speed, acceleration, turning speed (steering speed), and turning acceleration (steering acceleration), Additionally or alternatively, the control range may include a range of information amount (data amount, number of content items) presented to the user via a display or the like.

The parking control apparatus 100 according to one or more embodiments of the present invention is a remote control-type apparatus that receives the operation command from external and controls the movement of the vehicle V to park the vehicle V into a given parking space. During this operation, the occupants may be located outside the vehicle interior or may also be located inside the vehicle interior.

The parking control apparatus 100 according to one or more embodiments of the present invention may be of an autonomous (automated) control type in which the steering operation and the accelerator/brake operation are performed in an autonomous manner. The parking control apparatus 100 may also be of a semiautonomous (semiautomated) type in which the steering operation is performed in an autonomous manner while the driver performs the accelerator/brake operation.

In the parking control program according to one or more embodiments of the present invention, the user may arbitrarily select the target parking position, or the parking control apparatus 100 or the parking facility side may automatically set the target parking position.

The control device 10 of the parking control apparatus 100 according to one or more embodiments of the present invention has functions of executing a detection process for the movement of the operator M, a calculation process for the anxiety level, a calculation process for the parking route, a calculation process for the control instruction, and a parking control process. Each of the above processes is executed by cooperation of software for implementing the process and the above-described hardware.

Some processes of detecting the position of the operator M will be described with reference to FIGS. 2A to 2D. The "movement of the operator M" can be detected from the detection result history of positions of the operator M.

The control device 10 acquires the position of the operator M. The position of the operator M is used for calculation of a blind area. The position of the operator M includes information on the position and information on the height on the movement plane of the vehicle V. The position of the operator M may be detected on the basis of the sensor signals from sensors provided in the vehicle V or may also be obtained through detecting the position of the operation terminal 5 carried by the operator M and calculating the position of the operator M on the basis of the position the operation terminal 5. The operation terminal 5 may be provided at a predetermined position or may also be carried by the operator M. When the operation terminal 5 is provided at a predetermined position, the operator M moves to the position at which the operation terminal 5 is provided, and uses the operation terminal 5 at that position. In these cases, the position of the operation terminal 5 can be employed as the position of the operator M.

Figure 2A:
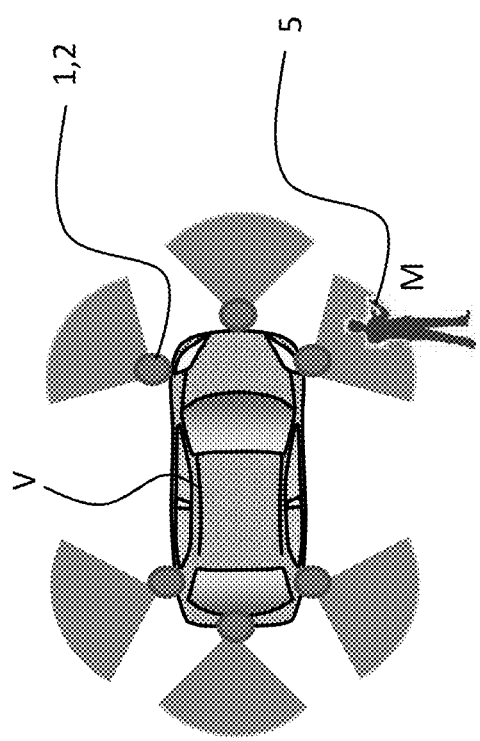
FIG. 2A is a diagram for describing a first detection scheme for the position of an operator.

As illustrated in FIG. 2A, the position of the operator M is detected on the basis of the detection results from the multiple ranging devices 2 provided in the vehicle and/or the images captured by the cameras 1. The position of the operator M can be detected on the basis of the images captured by the cameras 1a to 1d. The ranging devices 2 for use may each be a radar device, such as a millimeter-wave radar device, a laser radar device, or an ultrasonic radar device, or a sonar device. The multiple ranging devices 2 and their detection results can be identified, and the two-dimensional position and/or three-dimensional position of the operator M can therefore be detected on the basis of the detection results. The ranging devices 2 may be provided at the same positions as the cameras 1a to 1d or may also be provided at different positions. The control device 10 can also detect a gesture of the operator M on the basis of the images captured by the cameras 1a to 1d and identify the operation command associated with the gesture (i.e., the operator M can input the operation command by the gesture).

Figure 2B:
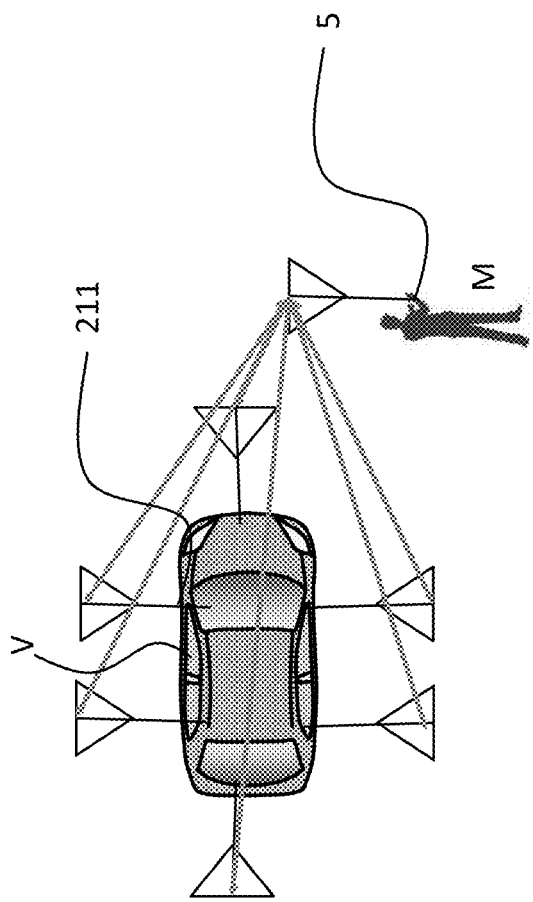
FIG. 2B is a diagram for describing a second detection scheme for the position of an operator.

As illustrated in FIG. 2B, the position of the operation terminal 5 or the position of the operator M carrying the operation terminal 5 may also be detected on the basis of the communication radio waves between multiple antennas 211 provided at different positions of the vehicle V and the operation terminal 5. When the multiple antennas 211 communicate with one operation terminal 5, the intensity of the received radio wave of each antenna 211 is different. The position of the operation terminal 5 can be calculated on the basis of the intensity difference between the received radio waves of the antennas 211. The two-dimensional position and/or three-dimensional position of the operation terminal 5 or of the operator M can be calculated from the intensity difference between the received radio waves of the antennas 211.

Figure 2C:
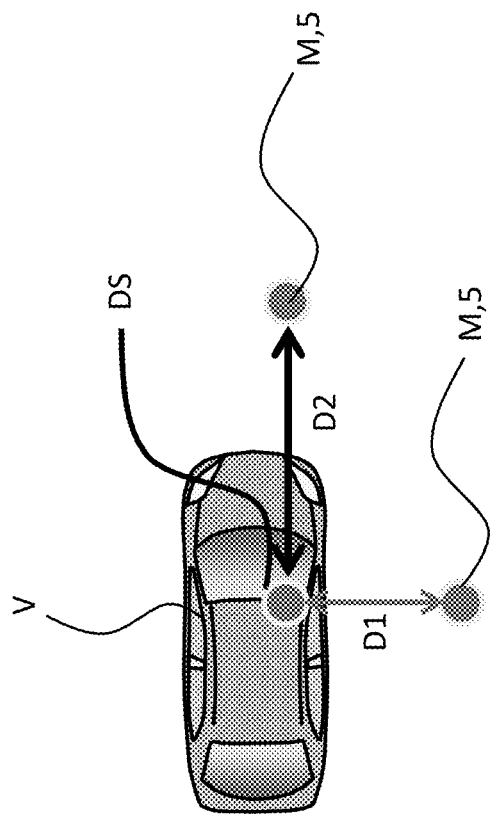
FIG. 2C is a diagram for describing a third detection scheme for the position of an operator.

As illustrated in FIG. 2C, a predetermined position (direction/distance: D1, D2) with respect to the driver seat DS of the vehicle V may be preliminarily designated as the operating position of the operator M or as the position at which the operation terminal 5 is disposed. For example, when the operator M temporarily stops the vehicle V at a designated position and gets off the vehicle V to operate the operation terminal 5 provided at the predetermined position, it is possible to calculate the initial position of the operator M with respect to the vehicle V or the initial position of the terminal 5, which is carried by the operator M, with respect to the vehicle V.

Figure 2D:
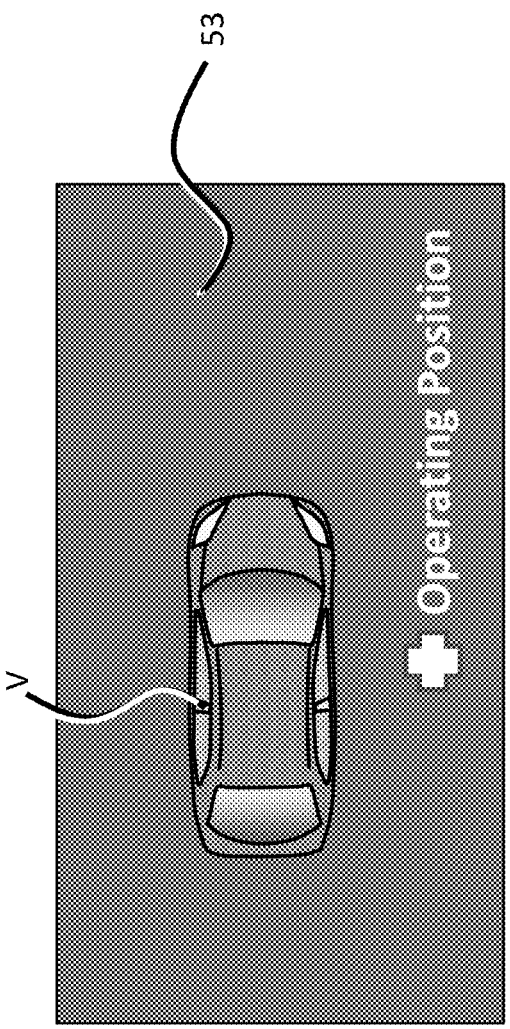
FIG. 2D is a diagram for describing a fourth detection scheme for the position of an operator.

As illustrated in FIG. 2D in a similar manner, image information representing the operating position (a position at which the operator M stands: operation position) with respect to the vehicle V is displayed on the display 53 of the operation terminal 5. This display control may be executed by an application installed on the operation terminal 5 side or may also be executed on the basis of a command from the control device 10.

In one or more embodiments of the present invention, the position of the operator M is calculated to calculate a second area which the operator M can visually recognize or a first area (blind area) which the operator M cannot visually recognize. When calculating the second area (or the first area), the detected two-dimensional position of the operator M may be calculated as the observation position. In this calculation, the eye position of the operator M (height information) may be taken into account. A position corresponding to the eye position of the operator M is calculated as the observation position on the basis of the two-dimensional position of the operation terminal 5 obtained by the above scheme. The observation position may also be calculated using the standing height of the operator M, which is preliminarily set, or the average standing height of adults. When the detection signal representing the positional information of the operation terminal 5 includes height information, the position of the operation terminal 5 may be employed as the observation position.

The detection process for an obstacle will be described with reference to FIGS. 3A and 3B. Obstacles include structures, such as walls and pillars of a parking lot, installations around the vehicle, pedestrians, other vehicles, parked vehicles, etc.

Figure 3A:
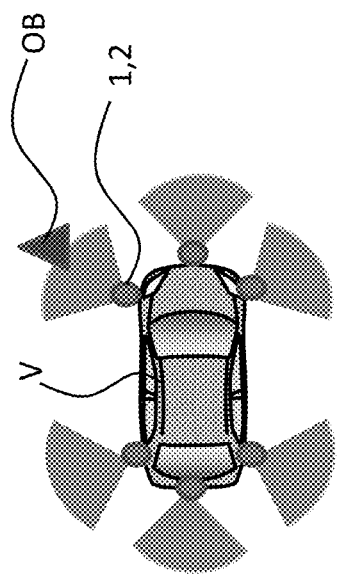
FIG. 3A is a diagram for describing a first detection scheme for an obstacle.

As illustrated in FIG. 3A, an obstacle is detected on the basis of the detection results from the multiple ranging devices 2 provided in the vehicle V and the images captured by the cameras 1. The ranging devices 2 detect the existence or absence of an object, the position of the object, the size of the object, and the distance to the object on the basis of the received signals from the radar devices. Additionally or alternatively, the existence or absence of an object, the position of the object, the size of the object, and the distance to the object may be detected on the basis of the images captured by the cameras 1a to 1d. The detection of an obstacle may be performed using a motion stereo technique with the cameras 1a to 1d. The detection results are used to determine whether or not a parking space is empty (whether or not a vehicle is parked in the parking space).

Figure 3B:
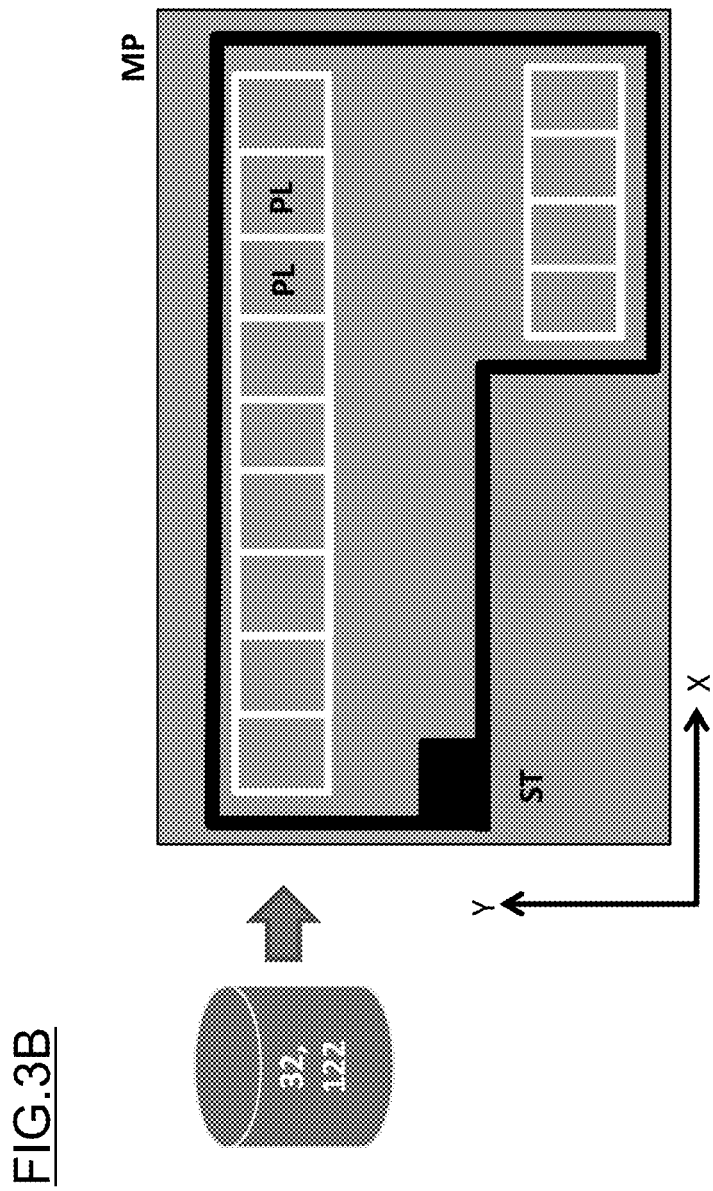
FIG. 3B is a diagram for describing a second detection scheme for an obstacle.

As illustrated in FIG. 3B, obstacles including structures such as walls and pillars of a parking lot can be detected on the basis of the parking lot information 34 acquired from the storage device 32 of the information server 3. The parking lot information includes the location and identification number of each parking lot and positional information of passages, pillars, walls, storage spaces, etc. in the parking facility. The information server 3 may be managed by parking facilities.

The control procedure of parking control will be described below with reference to the flowchart illustrated in FIG. 4.

FIG. 4 is a flowchart illustrating the control procedure of the parking control process executed by the parking control system 1000 according to one or more embodiments of the present invention. The trigger for starting the parking control process is not particularly limited, and the parking control process may be triggered by the operation of a start switch of the parking control apparatus 100.

The parking control apparatus 100 according to one or more embodiments of the present invention has a function of moving the vehicle V in an autonomous manner to a parking space on the basis of the operation command acquired from outside of the vehicle.

In step 101, the control device 10 of the parking control apparatus 100 acquires information around the vehicle. Acquisition of the ranging signals and acquisition of the captured images may be selectively executed. The control device 10 acquires the ranging signals, as necessary, from the ranging devices 2 which are attached to multiple sites of the vehicle V. The control device 10 acquires the images, as necessary, which are captured by the cameras 1a to 1d attached to multiple sites of the vehicle V. Although not particularly limited, the camera 1a is disposed on the front grille part of the vehicle V, the camera 1d is disposed in the vicinity of the rear bumper, and the cameras 1b and 1c are disposed on the lower parts of the right and left door mirrors. The cameras 1a to 1d may each be a camera having a wide-angle lens with a wide view angle. The cameras 1a to 1d capture images of boundary lines of parking spaces around the vehicle V and objects existing around the parking spaces. The cameras 1a to 1d may be CCD cameras, infrared cameras, or other appropriate imaging devices.

In step 102, the control device 10 detects parking spaces into which parking is possible. The control device 10 detects frames (areas) of parking spaces on the basis of the images captured by the cameras 1a to 1d. The control device 10 detects empty parking spaces using the detection data from the ranging devices 2 and the detection data extracted from the captured images. The control device 10 detects parking available spaces from among the parking spaces. The parking available spaces are parking spaces which are empty (i.e., other vehicles are not parked) and to which routes for completing the parking can be calculated.

In one or more embodiments of the present invention, the condition that a parking route can be calculated means that a trajectory of the route from the current position to a target parking position can be rendered on the road surface coordinates without interfering with obstacles (including parked vehicles).

In step 103, the control device 10 transmits the parking available spaces to the operation terminal 5, controls the display 53 to display the parking available spaces, and requests the operator M to input selection information of the target parking position for parking the vehicle V. The target parking position may be automatically selected by the control device 10 or the parking facility side. When the operation command of specifying a parking space is input to the operation terminal 5, the parking space is set as the target parking position.

In one or more embodiments of the present invention, the operator performs a so-called remote parking process in which the operator gets off the vehicle V and parks the vehicle V from the outside. In step 104, the operator M gets off the vehicle. The operator who has got off the vehicle inputs operation information regarding the parking process to the operation terminal 5. The operation information includes at least a parking process start instruction. The operation information is transmitted to the control device 10.

In step 105, the control device 10 calculates the anxiety level of the operator M from the movement of the operator M.

Figure 5:
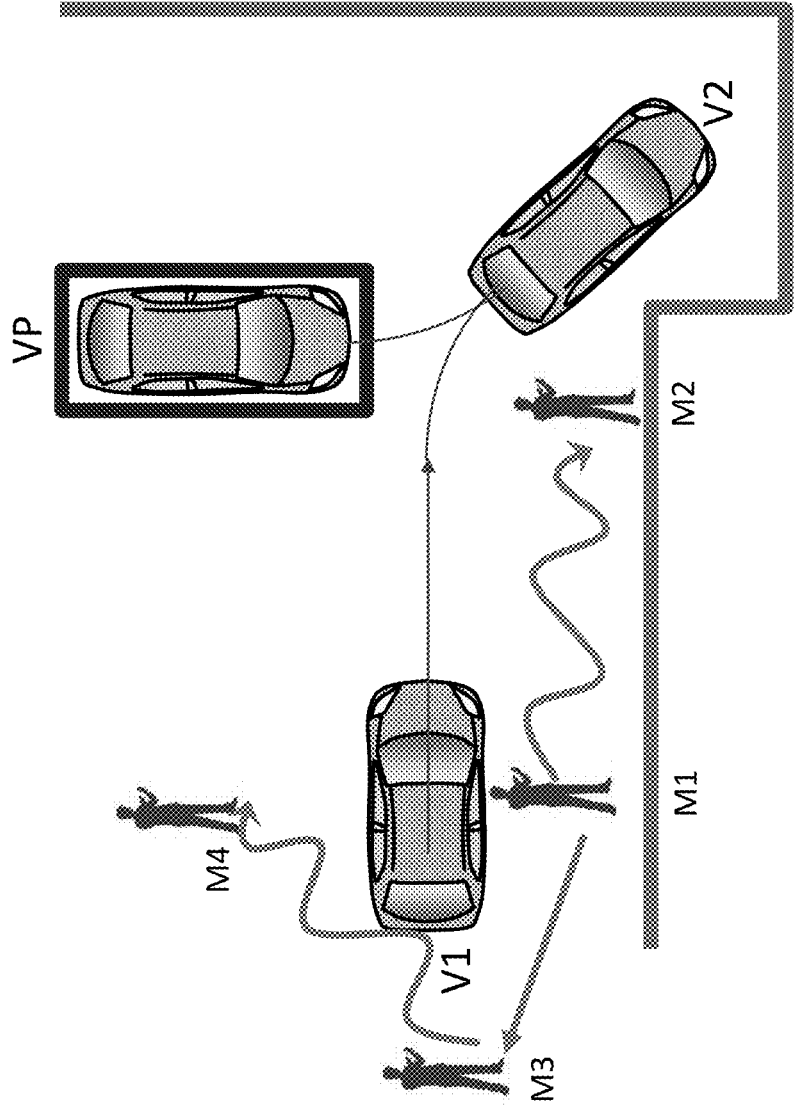
FIG. 5 illustrates a scheme of calculating the anxiety level of an operator.

According to the analysis of the movement of an operator M who performs the remote operation, it has been found that the operator M moves around when the operator M feels anxiety during the remote operation. When an operator M is anxious about whether the vehicle V collides with an obstacle, such as a wall or another vehicle, or whether there is a moving object approaching, the operator M tends to move around to check the surrounding situation. Also when an operator M cannot completely confirm the surroundings of the vehicle due to the occurrence of some blind areas, the operator M feels anxiety and tends to walk around the vehicle V. This situation is illustrated in FIG. 5. As illustrated in FIG. 5, an operator M who feels anxiety about the remote operation may move from a deboarding position M1 to a position M2 while meandering. Additionally or alternatively, the operator M may move from the deboarding position M1 to a position M3 behind the vehicle V1 which starts moving and further move to a position M4 on the left side of the vehicle V1 opposite to the deboarding position. Thus, the movement amount of an operator M who feels anxiety tends to be larger than usual. Moreover, an operator M who feels anxiety during the remote operation tends to increase the behavior amount (amount of movement due to behavior). An operator M who feels anxiety during the remote operation tends to run with short steps and move faster than normal walking, tends to repeat stop-and-go and move with higher acceleration than normal walking, tends to move with a larger difference in elevation than normal movement, such as stretching out or going up to a rising place, or tends to move with a large amount of angle of the movement trajectory, such as changing the moving direction. Additionally or alternatively, when feeling anxiety during the remote operation, the operator may move in various directions, and the plots of existence positions are more dispersed than when walking to a normal destination.

The control device 10 calculates the anxiety level of the operator M on the basis of the temporal change in the position of the operator M (or on the basis of the change in the position of the operator M over the time). The position of the operator M can be detected using the previously described method. The position of the operation terminal 5 carried by the operator M may be employed as the position of the operator M. By storing the position of the operator M over time, the temporal change in the position of the operator M can be calculated.

The present inventors have further analyzed the movement of the operator M when feeling anxiety about the remote operation and derived a relationship with the anxiety level. FIG. 6 is a diagram illustrating the relationship between the movement of an operator and the anxiety level. As illustrated in FIG. 6, the control device 10 calculates the anxiety level of the operator M on the basis of the "movement amount," "moving speed," and "distribution" regarding the movement of the operator. Methods of calculating the anxiety level are not particularly limited, but a threshold is preliminarily set for each of the "movement amount," "moving speed," and "distribution," and when each factor is less than the corresponding threshold, the anxiety level is determined to be low and the evaluation value of the anxiety level is set to 0 (zero), while when each factor is not less than the corresponding threshold, the anxiety level is determined to be high, and the evaluation value of the anxiety level is set to 1.0. The numerical value of the evaluation value can be set as appropriate. Additionally or alternatively, the anxiety level of the operator M may be calculated on the basis of the value of each of the anxiety level based on the "movement amount," the anxiety level based on the "moving speed," and the anxiety level based on the "distribution" or may also be calculated by combining them. The anxiety level based on the "movement amount," the anxiety level based on the "moving speed," and the anxiety level based on the "distribution" may be weighted to obtain respective anxiety levels, which may be summed up to calculate the anxiety level of the operator M.

The anxiety level of the operator M can be calculated on the basis of the temporal change in the position of the operator M, and the parking control can therefore be executed in accordance with the anxiety level of the operator M.

The control device 10 may calculate the anxiety level of the operator M on the basis of the "movement amount" of the operator M. The movement amount of the operator M can be calculated on the basis of the temporal change in the position of the operator M or the position of the operation terminal 5. The movement amount of the operator M may be a distance (integrated value) along which the operator M has actually moved within a predetermined time, or may also be a distance from the initial position to the current position. When calculating the anxiety level, a relational expression in which the movement amount is preliminarily associated with the anxiety level may be used.

FIG. 7A illustrates the relationship between the "movement amount" of the operator M and the anxiety level. The larger the movement amount MD, the higher the anxiety level AX of the operator M. When the movement amount MD is not less than a threshold TH1 that is preliminarily set, the anxiety level AX of the operator M is determined to be high, while when the movement amount MD is less than the preliminarily set threshold TH1, the anxiety level AX of the operator M is determined to be low. When the anxiety level AX is high, the evaluation value is set to 1.0, while when the anxiety level AX is low, the evaluation value is set to 0.

The movement amount of the operator M who feels anxiety tends to be larger than usual. The anxiety level of the operator M can be calculated on the basis of the movement amount, and the parking control can therefore be executed in accordance with the anxiety level of the operator M.

The control device 10 may calculate the anxiety level of the operator M on the basis of the "behavior amount (amount of movement due to behavior)" of the operator M. The "behavior amount" includes any one or more of the moving speed, movement acceleration, amount of change in the moving direction, and amount of change in the height position of the operator M. The moving speed, movement acceleration, and amount of change in the moving direction of the operator M can be calculated on the basis of the temporal change in the position of the operator M or the position of the operating terminal 5. The amount of change in the height position of the operator M can be calculated on the basis of the temporal change in the height position of the operation terminal 5 carried by the operator M. Information on the height position can be calculated on the basis of the detection value from an altitude sensor of the operation terminal 5. The moving speed of the operator M may be an average speed or may also be a maximum speed. The movement acceleration of the operator M may be an average acceleration or may also be a maximum acceleration. The amount of change in the moving direction of the operator M may be a turning angle or may also be an amount of change in the turning angle (turning speed). The operator M who feels anxiety tends to move from place to place. The amount of change in the height position of the operator M may be an average value of the amount of change in the height or may also be its maximum value. When calculating the anxiety level, a relational expression in which the amount of movement caused by the behavior of the operator M is preliminarily associated with the anxiety level be used.

Figure 7B:
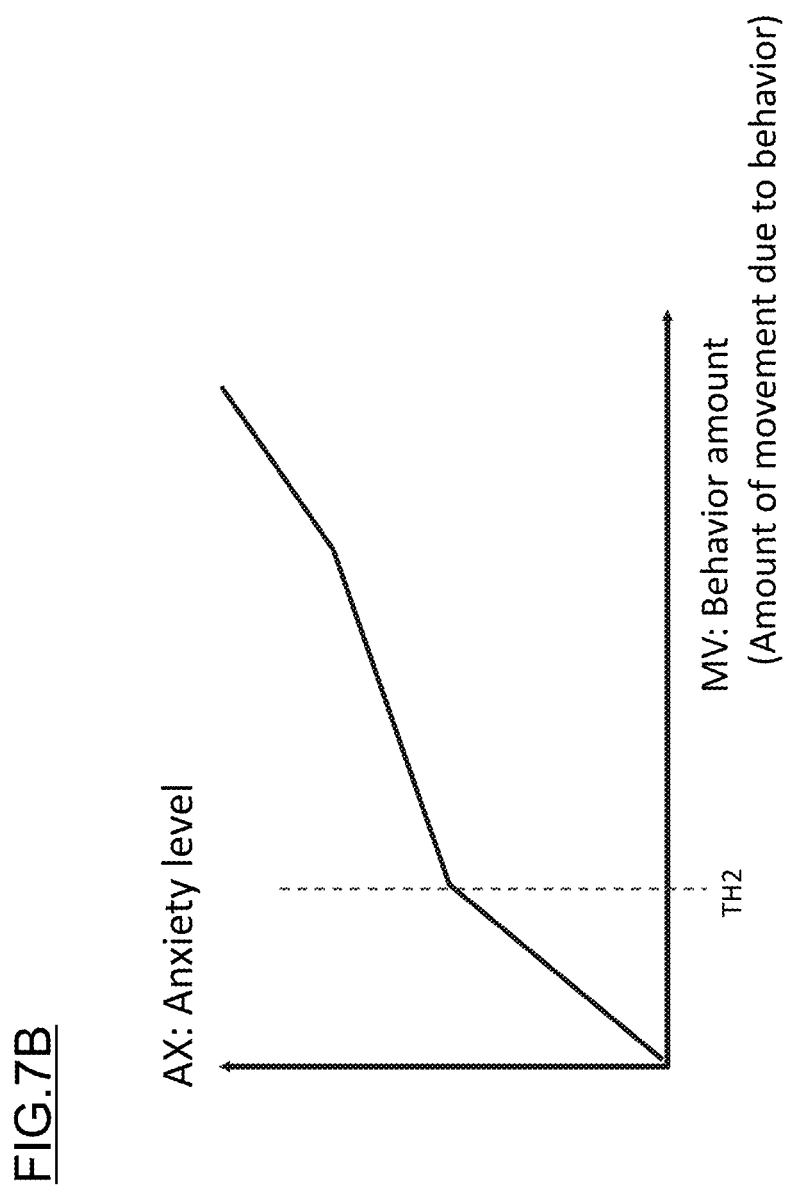
FIG. 7B is a diagram illustrating the relationship between a moving speed MV of an operator and an anxiety level AX.

FIG. 7B illustrates the relationship between the "behavior amount (amount of movement due to behavior)" MV of the operator M and the anxiety level. The larger the behavior amount MV, amount of movement caused by the behavior, the higher the anxiety level AX of the operator M. When the behavior amount MV of the operator M is not less than a threshold TH2 that is preliminarily set, the anxiety level AX of the operator M is determined to be high, while when the behavior amount MV of the operator M is less than the preliminarily set threshold TH2, the anxiety level AX of the operator M is determined to be low. When the anxiety level AX is high, the evaluation value is set to 1.0, while when the anxiety level AX is low, the evaluation value is set to 0.

The operator M who feels anxiety during the remote operation tends to run with short steps and move faster than normal walking, tends to repeat stop-and-go and move with higher acceleration than normal walking, tends to move back and forth in various directions, or tends to change the moving direction at short intervals. The anxiety level of the operator M can be calculated on the basis of the "behavior amount" including any one or more of the moving speed, movement acceleration, amount of change in the moving direction, and amount of change in the height position of the operator M, and the parking control can therefore be executed in accordance with the anxiety level of the operator M.

The control device 10 may calculate the anxiety level of the operator M on the basis of the "distribution of existence position" of the operator M. The distribution of position of the operator M can be calculated on the basis of the detection results of the position of the operator M or the position of the operation terminal 5. The distribution of position of the operator M may be represented by the number of times of existence at respective position coordinates. When calculating the anxiety level, a relational expression in which the distribution of moving speed or movement acceleration is preliminarily associated with the anxiety level may be used.

Figure 7C:
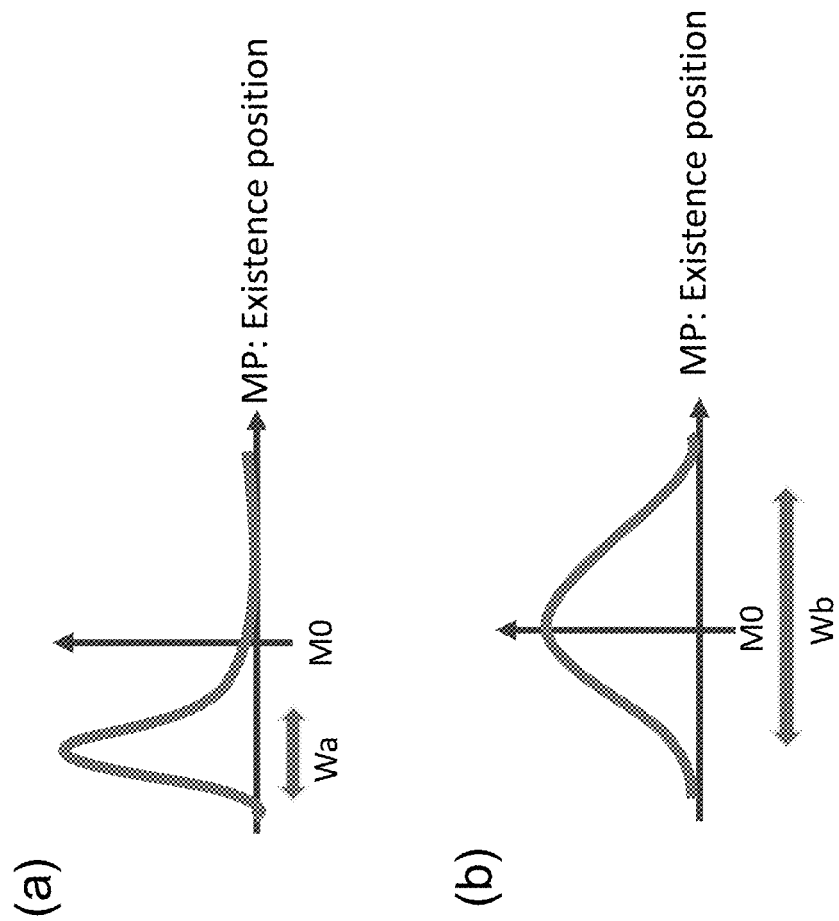
FIG. 7C is a set of diagrams (a) and (b) each illustrating the distribution of a moving position MP of an operator.

FIG. 7C is a set of diagrams (a) and (b), which each illustrate the "distribution of existence position" of the operator M, for example, with reference to an initial position M0 such as the deboarding position. FIG. 7C (a) illustrates the distribution of the existence position of an operator (monitor) who does not feel anxiety about the remote operation, and FIG. 7C (b) illustrates the distribution of the existence position of a monitor who feels anxiety about the remote operation. A distribution width Wa of the existence position of the operator without anxiety illustrated in FIG. 7C (a) is narrower than a distribution width Wb of the existence position of the operator with anxiety. The existence position of the operator M may be determined on the basis of the existence position of the operation terminal 5. Samples for obtaining the distribution may be existence positions at which the operator M or the operation terminal 5 has existed while the vehicle V moves from the parking control position to the current position or may also be existence positions at which the operator M or the operation terminal 5 has existed during a past predetermined time (e.g., 5 seconds) to the current timing.

FIG. 7D illustrates the relationship between the "variance value of the existence position" obtained from the distribution of the existence position of FIG. 7C and the anxiety level. The larger the variance value MS of the existence position, the higher the anxiety level AX of the operator M. When the variance value MS of the existence position is not less than a threshold TH3 that is preliminarily set, the anxiety level AX of the operator M is determined to be high, while when the variance value AX is less than the preliminarily set threshold TH3, the anxiety level AX of the operator M is determined to be low. When the anxiety level AX is high, the evaluation value is set to 1.0, while when the anxiety level AX is low, the evaluation value is set to 0.

The operator M who feels anxiety during the remote operation tends to move in various directions rather than performing directional movement. The anxiety level of the operator M can be calculated on the basis of the variance value of the existence position, and the parking control can therefore be executed in accordance with the anxiety level of the operator M.

Referring again to FIG. 4, in step 106, the control device 10 detects the position at which an obstacle exists, using the previously described scheme.

In step 107, the control device 10 calculates a parking route to the target parking position. The parking route includes a position of turn for parking necessary for moving to the parking space. For this operation, the parking route is defined as a line and is also defined as a strip-shaped area corresponding to the occupied area by the vehicle V based on the vehicle width. The occupied area by the vehicle V is defined with consideration for the vehicle width and a margin width ensured for movement.

When the anxiety level is not less than a predetermined threshold, the control device 10 according to one or more embodiments of the present invention generates a second control instruction obtained by limiting the control range of a first control instruction that is preliminarily set in the control instruction for moving the vehicle along the parking route.

The limitation of the control range regarding the generation process for the parking route will be described first.

In general, when calculating a parking route, the parking route is calculated such that a predetermined margin distance range is provided between the parking route and an obstacle, that is, a clearance is provided. The margin distance range can be defined by a value range of margin distance that is defined by an upper limit and a lower limit. The control device 10 according to one or more embodiments of the present invention generates a second parking route when the anxiety level is not less than a predetermined threshold. When the anxiety level of the operator is not less than a predetermined threshold, the second parking route is calculated such that a second margin distance range between the second parking route and an obstacle is longer than a first margin distance range between a first parking route and the object. The second margin distance range is a control range included in the second control instruction. The first margin distance range is a control range included in the preliminarily set first control instruction. In other words, when the anxiety level of the operator is not less than the predetermined threshold, the distance along which the vehicle moves to approach the obstacle becomes small. The approach distance to the obstacle becomes long.

FIG. 8A is a diagram illustrating an example of the control range of the parking route calculation process. As illustrated in FIG. 8A, when the anxiety level is less than a predetermined threshold, the operator M does not feel anxiety, so the first margin distance range between the obstacle and the parking route is set to be relatively short. Although not particularly limited, a clearance of about 20 cm is ensured. This first margin distance range is a standard value that is preliminarily set. On the other hand, when the anxiety level is not less than the predetermined threshold, the operator M feels anxiety, so the first margin distance range between the obstacle and the parking route is changed to the second margin distance range longer than the first margin distance range. Although not particularly limited, a clearance of about 50 cm is ensured by the second margin distance range.

When a determination is made that the operator M feels anxiety, the preliminarily set first margin distance range is changed to the second margin distance range longer than the first margin distance range. By widening the clearance from the obstacle, the operator M who feels anxiety can perform the remote operation in relief. The operator M can perform the operation while confirming the obstacle and the vehicle V moving along the parking route, and the remote operation is thus facilitated.

The control device 10 sets the second margin distance range to a longer distance as the anxiety level which is a degree of anxiety felt by the operator M is higher. That is, the larger the anxiety of the operator M, the wider the clearance width from the obstacle is set. FIG. 8B is a diagram illustrating the relationship between an anxiety level AX and a margin distance OBD of the parking route. As illustrated in FIG. 8B, as the anxiety level increases, a larger value of the margin distance OBD is set, and the parking route along which the margin distance OBD is ensured is calculated. The higher the anxiety level, the longer the second margin distance range is set, so the anxiety felt by the operator M can be alleviated.

The limitation of the control range of the control instruction for moving along the parking route will then be described.

When the anxiety level is not less than a predetermined threshold, the control device 10 calculates the second control instruction obtained by limiting the control range of the first control instruction which is preliminarily set in the control instruction. When the operator M who performs the remote operation feels anxiety, the control range of the first control instruction is changed, and a new second control instruction is calculated. The new second control instruction provides a control range in which the anxiety about the remote operation of the parking control is more alleviated than that provided by the first control instruction. For example, the moving speed is changed to be low and the acceleration/deceleration is also changed to be small. By changing the control range of the control instruction in such a manner, the anxiety of the operator M can be alleviated and the remote operation is thus facilitated.

FIG. 9A is a diagram illustrating an example of the control range of the control instruction calculation process. The control range to be limited (changed) is a speed range that is set in the control instruction. The speed range in the control instruction includes the upper limit speed, upper limit acceleration, upper limit deceleration, and turning speed (steering speed). Although not illustrated, the upper limit turning amount and turning acceleration (steering acceleration), which affect the speed can also be included in the speed range.

The control device 10 calculates the second control instruction such that a second speed range included in the second control instruction is lower than a first speed range included in the first control instruction. The operator M monitors the movement of the vehicle V to be controlled. The higher the speed range of the vehicle V, the more difficult it is to monitor the vehicle V. When the operator M feels anxiety, the speed range during the movement of the vehicle V to be parked is changed to a low value. That is, the upper limit of the speed range is lowered. The lower limit of the speed range may also be lowered. Thus, the anxiety of the operator M can be alleviated and the remote operation is facilitated.

For example, the control device 10 calculates the second control instruction such that a second upper limit speed included in the second control instruction is lower than a first upper limit speed included in the first control instruction. When the operator M feels anxiety, the upper limit speed during the movement of the vehicle V to be parked is changed to be low; therefore, the anxiety of the operator M can be alleviated and the remote operation is thus facilitated.

As illustrated in FIG. 9A, when the anxiety level is less than a threshold, the upper limit speed is set high (e.g., 10 km/h), while when the anxiety level is not less than the threshold, the upper limit speed is set low (e.g., 5 km/h). When the anxiety level is less than a threshold, the upper limit acceleration or upper limit deceleration is set high (e.g., 0.1 G), while when the anxiety level is not less than the threshold, the upper limit acceleration or upper limit deceleration is set low (e.g., 0.05 G). When the anxiety level is less than a threshold, the upper limit turning speed (steering speed) is set high, while when the anxiety level is not less than the threshold, the turning speed (steering speed) is set low.

The control device 10 sets the second speed range (upper limit speed and/or lower limit speed) to a lower value as the anxiety level of the operator M is higher. FIG. 9B is a diagram illustrating the relationship between an anxiety level AX and an upper limit speed VF. As illustrated in the figure, the higher the anxiety level, the lower the speed (upper limit and/or lower limit) of the speed range. When the speed range is a value range of the vehicle speed, the higher the anxiety level, the lower the upper limit speed and/or the lower limit speed. When the speed range is represented by a value range of the acceleration, the higher the anxiety level, the lower the upper limit acceleration and/or the lower limit acceleration. When the speed range is represented by the upper limit turning speed (steering speed), the higher the anxiety level, the lower the upper limit turning speed (steering speed) and/or the lower limit turning speed (steering speed).

The control device 10 sets the second speed range to a lower value as the anxiety level of the operator M is higher, and the vehicle V can therefore be moved more slowly as the anxiety felt by the operator M is larger. This can alleviate the anxiety of the operator M and the remote operation is thus facilitated.

Figure 10A:
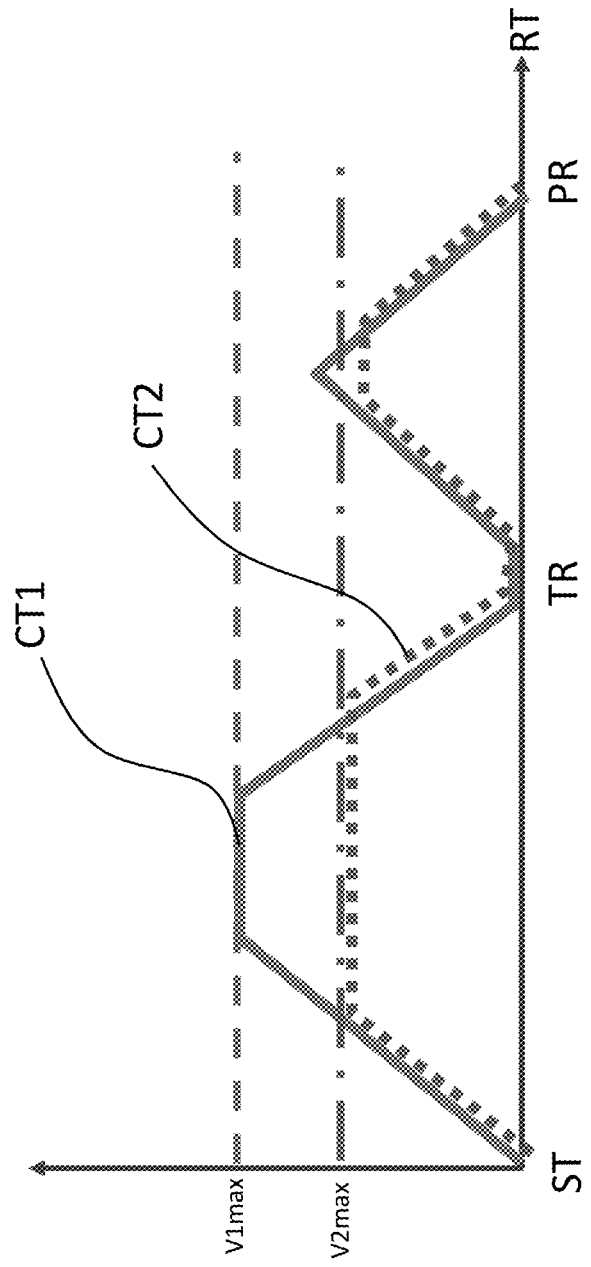
FIG. 10A is a diagram illustrating a first example of the control instruction regarding the speed.

FIG. 10A is a diagram illustrating a first example of the control instruction regarding the speed range. The speed range is associated with each position on the parking route RT. In the parking route RT, the parking control start position is denoted by ST, the point of turn for parking is denoted by TR, and the parking completion position is denoted by PR.

FIG. 10A illustrates a first control instruction CT1 in which the first speed range is set and a second control instruction CT2 in which the second speed range is set. The first control instruction CT1 represents the transition of target speed which is the first speed range, and the second control instruction CT2 represents the transition of target speed which is the second speed range. A first upper limit speed that defines the first speed range of the first control instruction CT1 is represented by V1max, and a second upper limit speed that defines the second speed range of the second control instruction CT2 is represented by V2max. The second upper limit speed V2max is lower than the first upper limit speed V1max. In the second control instruction CT2, a relatively low upper limit speed is set and the target speed VT is also low; therefore, the vehicle V can be moved slowly. This can alleviate the anxiety of the operator M and the remote operation is thus facilitated.

FIG. 10B is a diagram illustrating a second example of the control instruction regarding the speed range. The speed range is associated with each position on the parking route RT. The first control instruction CT1 is illustrated for reference. In addition, the transition of first target acceleration VA1 which represents the first speed range of the first control instruction CT1 and the transition of second target acceleration VA2 which represents the second speed range of the second control instruction CT2 are illustrated. The second target acceleration VA2 is a lower value than the first target acceleration VA1, and it can be found that the second control instruction causes a small speed variation. This can alleviate the anxiety of the operator M and the remote operation is thus facilitated.

Figure 11A:
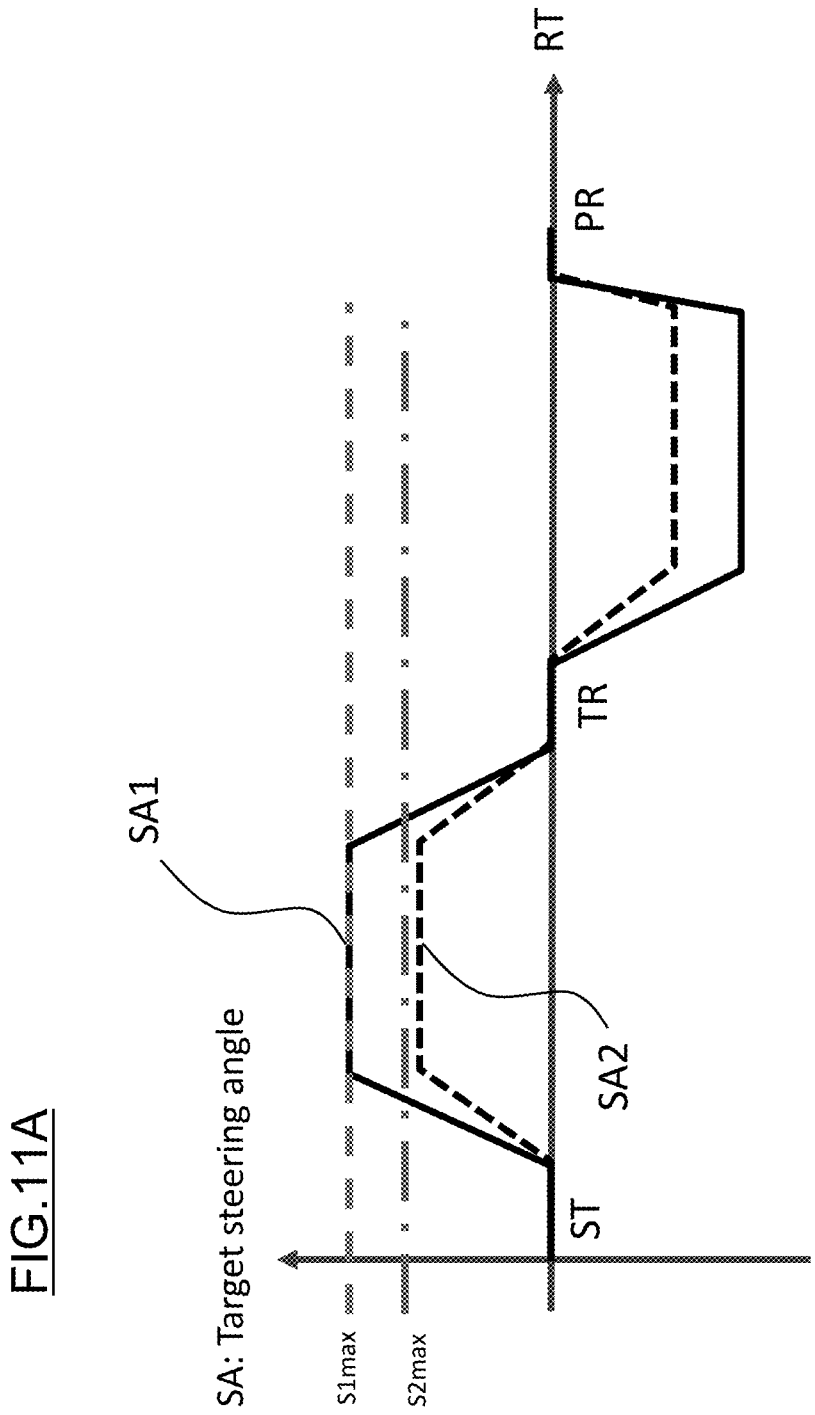
FIG. 11A is a diagram illustrating a first example of the control instruction regarding the steering angle.

FIG. 11A is a diagram illustrating a first example of the control instruction regarding the steering. The steering angle range is associated with each position on the parking route RT. In the parking route RT, the parking control start position is denoted by ST, the point of turn for parking is denoted by TR, and the parking completion position is denoted by PR.

FIG. 11A illustrates a first control instruction SA1 in which the first steering angle range is set and a second control instruction SA2 in which the second steering angle range is set. The first control instruction SA1 provides the transition of target steering angle SA which represents the first steering angle range, and the second control instruction SA2 provides the transition of target steering angle SA which represents the second steering angle range. A first upper limit steering amount that defines the first steering angle range of the first control instruction SA1 is represented by S1max, and a second upper limit steering amount that defines the second steering angle range of the second control instruction SA22 is represented by S2max. The second upper limit steering amount S2max is smaller than the first upper limit steering amount S1max. In the second control instruction SA2, a relatively small upper limit steering amount is set and the target steering angle SA is also small; therefore, the vehicle V travels at a low steering angle and can be moved slowly/gradually. This can alleviate the anxiety of the operator M and the remote operation is thus facilitated.

FIG. 11B is a diagram illustrating a second example of the control instruction regarding the speed range of steering angle. The speed range of steering angle is associated with each position on the parking route RT. The figure illustrates a first control instruction SA1, a second control instruction SA2, the transition of a first steering speed limit VSA1, and the transition of a second steering speed limit VSA2. The second steering speed limit VSA2 is a lower value than the first steering speed limit VSA1, and it can be found that the steering amount and steering speed in the second control instruction are small and low. The steering speed is also set low; therefore, the vehicle V travels at a low speed of steering angle and can be moved slowly/gradually. This can alleviate the anxiety of the operator M and the remote operation is thus facilitated.

When the anxiety level is not less than a predetermined threshold, the control device 10 limits the amount of information presented regarding the parking control. The information regarding the parking control includes the content of the control instruction, the control range of the control instruction, menu options, control instruction options, etc.

FIG. 12 is a diagram illustrating a first example of the control instruction regarding operation menus. As illustrated in FIG. 12, when the anxiety level is less than a threshold, three menus of a "position adjustment menu," a "screen setting menu," and "GO/STOP" are presented as menus of available control ranges, but when the anxiety level is not less than the threshold, the menus of available control ranges are limited, and only the "GO/STOP" menu is presented. FIG. 13A illustrates forms of limiting the menus of available control ranges as the presentation information. When the anxiety level AX is less than a threshold Thax, Options 1 and 2 are presented in addition to the "GO/STOP." On the other hand, when the anxiety level AX is not less than the threshold Thax, only the "GO/STOP" is presented.

When the anxiety level is less than a threshold, three modes of a "parking form selection," a "quick mode," and a "rescue mode" are presented as selectable parking modes in the control ranges, but when the anxiety level is not less than the threshold, the menus of selectable control ranges are limited, and only the "rescue mode" is presented. FIG. 13B illustrates forms of limiting the modes of selectable control ranges as the presentation information. When the anxiety level AX is less than a threshold Thax, Options 1 and 2 are presented in addition to the "rescue mode." On the other hand, when the anxiety level AX is not less than the threshold Thax, only the "rescue mode" is presented. As used herein, the rescue mode (recovery mode) refers to a process of moving the vehicle V to the position when the parking process is started. This is control for moving the vehicle V to the original position, as the emergency avoidance, when it is difficult to continue the parking process.

If a large amount of information is presented to the operator M who feels anxiety, the operator M may be confused. Moreover, if many options are presented to the operator M who feels anxiety, the operator M may also be confused. When the anxiety level of the operator M is not less than a predetermined threshold, the amount of information presented for the control range of the control instruction is limited thereby to allow the operator M to make an appropriate determination. This can alleviate the anxiety of the operator M and the remote operation is thus facilitated.

When the anxiety level of the operator M is not less than a predetermined threshold, the control device 10 calculates the second control instruction. The control device 10 preliminarily stores the spec information of the vehicle V necessary for the control instruction. Examples of the control instruction include instructions for the steering amount, steering speed, steering acceleration, shift position, speed (including zero), acceleration, and deceleration of the vehicle V, which are associated with the timing or position when the vehicle V travels along the parking route, and other operation instructions. The control instruction includes the execution timing or execution position of the above operation instruction for the vehicle V. The instruction regarding the parking route and the operation instruction associated with the parking route are executed by the vehicle V, and the vehicle can thereby be moved (parked) to the target parking position.

Referring again to FIG. 4, the operator M confirms the parking route in step 108, and when the execution instruction is input in step 109, the process proceeds to step 110, in which the control device 10 starts execution of the parking control.

In step 111, the control device 10 periodically calculates the anxiety level. The anxiety level of the operator M varies as the position of an obstacle and the position of the vehicle V vary. To respond to the change in the situation, the control device 10 calculates the anxiety level of the operator M at a predetermined cycle. In step 112, the control device 10 determines whether or not there is a change in the anxiety level. When there is a change, the parking route and the control instruction for moving along the parking route are calculated again. When a new appropriate parking route can be calculated, the new parking route is employed. The control device 10 calculates the control instruction for the new parking route. In step 113, the control device 10 updates the parking route and the control instruction, which are calculated in step 107, to the new parking route and the new control instruction. In step 112, when there is no change in the anxiety level, it is not necessary to calculate a new parking route and a new control instruction, so the process proceeds to step 114.

In step 114, the control device 10 monitors the change in the anxiety level until the vehicle V reaches the position of turn for parking. When the vehicle V reaches the position of turn for parking, the gear shift included in the control instruction is executed in step 115. Step 115 is followed by step 116, in which the parking control is completed by sequentially executing control instructions.

The parking control apparatus 100 according to one or more embodiments of the present invention operates to control the operation of the drive system 40 via the vehicle controller 70 in accordance with the control instruction so that the vehicle V moves along the parking route. The parking control apparatus 100 operates to calculate command signals to the drive system 40 of the vehicle V, such as an EPS motor, while feeding back the output value of the steering angle sensor 50 of the steering apparatus so that the travel trajectory of the vehicle V coincides with the calculated parking route, and transmit the command signals to the drive system 40 or to the vehicle controller 70 which controls the drive system 40.

The parking control apparatus 100 according to one or more embodiments of the present invention includes a control unit for parking control. The control unit for parking control acquires shift range information from an AT/CVT control unit, wheel speed information from an ABS control unit, steering angle information from a steering angle control unit, engine speed information from an ECM, and other necessary information. On the basis of these information items, the control unit for parking control calculates and outputs instruction information on the autonomous steering to the EPS control unit, instruction information such as warning to a meter control unit, etc. The control device 10 acquires information items, which are acquired by the steering angle sensor 50 of the steering apparatus of the vehicle V, the vehicle speed sensor 60, and other sensors of the vehicle V, via the vehicle controller 70.

The drive system 40 according to one or more embodiments of the present invention drives the vehicle V1 to move (travel) from the current position to the target parking position by driving based on the control command signals acquired from the parking control apparatus 100. The steering apparatus according to one or more embodiments of the present invention is a drive mechanism that moves the vehicle V in the right and left directions. The EPS motor included in the drive system 40 drives the power steering mechanism of the steering of the steering apparatus on the basis of the control command signals acquired from the parking control apparatus 100 to control the steering amount and controls the operation when moving the vehicle V to the target parking position. The control content and operation scheme for parking of the vehicle V are not particularly limited, and any scheme known at the time of filing this application can be appropriately applied.

When the parking control apparatus 100 according to one or more embodiments of the present invention operates to control the vehicle V to move to the target parking position along the route calculated on the basis of the position of the vehicle V and the position of the target parking position, the accelerator and the brake are controlled in an autonomous manner on the basis of the designated control vehicle speed (set vehicle speed), and the operation of the steering apparatus controls the movement of the vehicle V in an autonomous manner in accordance with the vehicle speed.

The parking control method according to one or more embodiments of the present invention is used in the parking control apparatus as the above and therefore exhibits the following effects. The parking control apparatus 100 according to one or more embodiments of the present invention is configured and operates as the above and therefore exhibits the following effects.

(1) In the parking control method according to one or more embodiments of the present invention, when the anxiety level is not less than a predetermined threshold, the second control instruction is calculated, which is obtained by limiting the control range of the first control instruction which is preliminarily set in the control instruction. When the anxiety level is less than the predetermined threshold and the operator M who performs the remote operation does not feel anxiety, the vehicle is parked in accordance with the first control instruction which is preliminarily set in the control instruction, while when the anxiety level is not less than the predetermined threshold and the operator M feels anxiety, the different second control instruction is calculated, which is obtained by limiting the control range of the first control instruction. The new second control instruction provides a control range in which the anxiety of the operator M about the remote operation of the parking control is more alleviated than that provided by the first control instruction. For example, the control range, which includes the range of the moving speed, the range of the acceleration/deceleration, the range of the turning speed (steering speed), and the range of the amount of information to be displayed, is changed to a lower value. Specifically, the upper limit of each control range is lowered. In addition, the lower limit of each control range may be reduced. Thus, by changing the control range of the control instruction to be low so that the anxiety of the operator M is reduced, the anxiety of the operator M can be alleviated and the remote operation is facilitated.

(2) In the parking control method according to one or more embodiments of the present invention, the second control instruction is calculated such that the second speed range included in the second control instruction is lower than the first speed range included in the first control instruction. As an example, the second control instruction is calculated such that the second speed upper limit included in the second control instruction is lower than the first speed upper limit included in the first control instruction. The operator M monitors the movement of the vehicle V to be controlled. The higher the speed range (upper limit speed/lower limit speed) of the vehicle V, the more difficult it is to monitor the vehicle V. When the operator M feels anxiety, the speed range during the movement of the vehicle V to be parked is changed to a low value. Thus, the anxiety of the operator M can be alleviated and the remote operation is facilitated.

For example, the control device 10 calculates the second control instruction such that the second upper limit speed included in the second control instruction is lower than the first upper limit speed included in the first control instruction. When the operator M feels anxiety, the upper limit speed during the movement of the vehicle V to be parked is changed to be low; therefore, the anxiety of the operator M can be alleviated and the remote operation is thus facilitated.

(3) In the parking control method according to one or more embodiments of the present invention, the control device 10 sets the second speed range (upper limit speed and/or lower limit speed) to a lower value as the anxiety level of the operator M is higher, and the vehicle V can therefore be moved more slowly as the anxiety felt by the operator M is larger. This can alleviate the anxiety of the operator M and the remote operation is thus facilitated.

(4) In the parking control method according to one or more embodiments of the present invention, when a determination is made that the operator M feels anxiety, the preliminarily set first margin distance range is changed to the second margin distance range longer than the first margin distance range. By widening the clearance from an obstacle, the operator M who feels anxiety can perform the remote operation in relief. The operator M can perform the operation while confirming the obstacle and the vehicle V moving along the parking route, and the remote operation is thus facilitated.

(5) In the parking control method according to one or more embodiments of the present invention, the second margin distance range is set to a longer distance (larger value) as the anxiety level which is a degree of anxiety felt by the operator M is higher. That is, the larger the anxiety of the operator M, the wider the clearance width from an obstacle is set. FIG. 8B is a diagram illustrating the relationship between an anxiety level AX and a margin distance OBD of the parking route. As illustrated in FIG. 8B, as the anxiety level increases, a larger value of the margin distance OBD is set, and the parking route along which the margin distance OBD is ensured is calculated. The higher the anxiety level, the longer the second margin distance range is set, so the anxiety felt by the operator M can be alleviated.

(6) In the parking control method according to one or more embodiments of the present invention, the anxiety level of the operator M can be calculated on the basis of the temporal change in the position of the operator M, and the parking control can therefore be executed in accordance with the anxiety level of the operator M.

(7) In the parking control method according to one or more embodiments of the present invention, the movement amount of the operator M who feels anxiety tends to be larger than usual. The anxiety level of the operator M can be calculated on the basis of the movement amount, and the parking control can therefore be executed in accordance with the anxiety level of the operator M.

(8) In the parking control method according to one or more embodiments of the present invention, the operator M who feels anxiety during the remote operation tends to run with short steps and move faster than normal walking, tends to repeat stop-and-go and move with higher acceleration than normal walking, tends to move back and forth in various directions, or tends to change the moving direction at short intervals. The anxiety level of the operator M can be calculated on the basis of the "behavior amount (amount of movement due to behavior)" including any one or more of the moving speed, movement acceleration, amount of change in the moving direction, and amount of change in the height position of the operator M, and the parking control can therefore be executed in accordance with the anxiety level of the operator M.

(9) In the parking control method according to one or more embodiments of the present invention, the operator M who feels anxiety during the remote operation tends to move in various directions rather than performing directional movement. The anxiety level of the operator M can be calculated on the basis of the variance value of the existence position, and the parking control can therefore be executed in accordance with the anxiety level of the operator M.

(10) In the parking control method according to one or more embodiments of the present invention, if a large amount of information is presented to the operator M who feels anxiety, the operator M may be confused. Moreover, if many options are presented to the operator M who feels anxiety, the operator M may also be confused. When the anxiety level of the operator M is not less than a predetermined threshold, the amount of information presented for the parking control is limited thereby to allow the operator M to make an appropriate determination. This can alleviate the anxiety of the operator M and the remote operation is thus facilitated.

(11) Also in the parking control apparatus 100 in which the method according to one or more embodiments of the present invention is executed, the actions and effects as described in the above (1) to (10) are exhibited.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1000 Parking control system
100 Parking control apparatus
10 Control device
11 CPU
12 ROM
13 RAM
132 Storage device
133 Map information
134 Parking lot information
135 Obstacle information
20 Input device
21 Communication device
211 Antennas
30 Output device
31 Display
1a-1d Cameras
2 Ranging devices
3 Information server
31 Communication device
32 Storage device
33 Map information
34 Parking lot information
35 Obstacle information
5 Operation terminal
51 Communication device
511 Antenna
52 Input device
53 Display
200 Onboard device
40 Drive system
50 Steering angle sensor
60 Vehicle speed sensor
70 Vehicle controller
V, V1 Vehicle

The invention claimed is:

1. A parking control method for executing a control instruction to move a vehicle along a parking route on a basis of an operation command acquired from an operator located outside the vehicle, comprising:

detecting movement of the operator after acquiring the operation command from the operator;

determining a degree of anxiety of the operator on a basis of the detected movement of the operator;

when the degree of anxiety is less than a predetermined threshold, parking the vehicle at a target parking position in accordance with a first control instruction that is preliminarily set in the control instruction; and when the degree of anxiety is greater than the predetermined threshold, calculating a second control instruction obtained by limiting a control range of the first control instruction, and parking the vehicle at the target parking position in accordance with the second control instruction.

2. The parking control method according to claim 1, further comprising:

calculating the second control instruction such that a second speed range that is a control range included in the second control instruction is lower than a first speed range that is the control range included in the first control instruction.

3. The parking control method according to claim 2, further comprising:

lowering the second speed range as the degree of anxiety is higher.

4. The parking control method according to claim 1, comprising:

detecting an obstacle existing around the vehicle; and when the degree of anxiety is greater than the predetermined threshold, calculating a second parking route such that a second margin distance range between the second parking route and the obstacle is longer than a first margin distance range between a first parking route and the obstacle, wherein the second margin distance range is a control range included in the second control instruction, and wherein the first margin distance range is a control range included in the first control instruction.

5. The parking control method according to claim 4, further comprising:

setting the second margin distance range to a longer distance as the degree of anxiety is higher.

6. The parking control method according to claim 1, further comprising:

determining the degree of anxiety of the operator on a basis of a temporal change in a position of the operator.

7. The parking control method according to claim 1, further comprising:

determining the degree of anxiety of the operator on a basis of a movement amount of the operator.

8. The parking control method according to claim 1, further comprising:

determining the degree of anxiety of the operator on a basis of a behavior amount of the operator.

9. The parking control method according to claim 1, further comprising:
  determining the degree of anxiety of the operator on a basis of a distribution of an existence position of the operator.

10. A parking control method for executing a control instruction to move a vehicle along a parking route on a basis of an operation command acquired from an operator located outside the vehicle, comprising:
  detecting movement of the operator;
  calculating an anxiety level of the operator from the movement of the operator;
  when the anxiety level is less than a predetermined threshold, parking the vehicle in accordance with a first control instruction that is preliminarily set in the control instruction; and
  when the anxiety level is greater than the predetermined threshold, calculating a second control instruction obtained by limiting a control range of the first control instruction, limiting an amount of information displayed for parking control, and parking the vehicle in accordance with the second control instruction.

11. A parking control apparatus for moving a vehicle along a parking route on a basis of an operation command acquired from an operator located outside the vehicle, the parking control apparatus including a control device comprising:
  a memory; and
  a processor configured to execute instructions stored in the memory to:
    detect movement of the operator after acquiring the operation command from the operator;
    determine a degree of anxiety of the operator based on an amount of the detected movement of the operator; and
    when the degree of anxiety is less than a predetermined threshold, park the vehicle at a target parking position in accordance with a first control instruction that is preliminarily set; and
    when the degree of anxiety is greater than the predetermined threshold, calculate a second control instruction obtained by limiting a control range of the first control instruction and park the vehicle at the target parking position in accordance with the second control instruction.

* * * * *